United States Patent
Sharon et al.

(10) Patent No.: US 8,059,915 B2
(45) Date of Patent: Nov. 15, 2011

(54) APPARATUS FOR AND METHOD OF ROBUST MOTION ESTIMATION USING LINE AVERAGES

(75) Inventors: Eitan Sharon, San Mateo, CA (US); Achiezer Brandt, San Mateo, CA (US)

(73) Assignee: Videosurf, Inc., San Mateo, CA (US)

( * ) Notice: Subject to any disclaimer, the term of this patent is extended or adjusted under 35 U.S.C. 154(b) by 1027 days.

(21) Appl. No.: 11/984,670

(22) Filed: Nov. 20, 2007

(65) Prior Publication Data

US 2008/0159630 A1  Jul. 3, 2008

Related U.S. Application Data

(60) Provisional application No. 60/869,271, filed on Dec. 8, 2006, provisional application No. 60/869,279, filed on Dec. 8, 2006, provisional application No. 60/866,552, filed on Nov. 20, 2006.

(51) Int. Cl.
*G06K 9/36* (2006.01)

(52) U.S. Cl. ........ 382/286; 382/274; 382/275; 382/291; 358/3.26; 358/3.27

(58) Field of Classification Search ................ 382/266, 382/274, 275, 286, 291; 358/3.26, 3.27, 358/463
See application file for complete search history.

(56) References Cited

U.S. PATENT DOCUMENTS

| | | | |
|---|---|---|---|
| 4,639,773 A | 1/1987 | Hurst | |
| 5,392,223 A | 2/1995 | Caci | |
| 5,410,643 A | 4/1995 | Yomdin et al. | |
| 5,473,384 A | 12/1995 | Jayant et al. | |
| 5,638,135 A | 6/1997 | Mukai | |
| 5,838,838 A | 11/1998 | Overton | |
| 5,886,745 A | 3/1999 | Muraji et al. | |
| 5,923,775 A | 7/1999 | Snyder et al. | |
| 6,229,929 B1 | 5/2001 | Lynch et al. | |
| 6,370,543 B2 | 4/2002 | Hoffert et al. | |
| 6,396,948 B1 | 5/2002 | Lynch et al. | |
| 6,442,203 B1 | 8/2002 | Demos | |

(Continued)

FOREIGN PATENT DOCUMENTS

CN 1199449 C 4/2005

(Continued)

OTHER PUBLICATIONS

Delgo at al., U.S Office Action mailed on Aug. 27, 2009, directed to U.S. Appl. No. 11/687,326; 57 pages.

(Continued)

*Primary Examiner* — Yosef Kassa
(74) *Attorney, Agent, or Firm* — Morrison & Foerster LLP

(57) ABSTRACT

A method of processing an image includes the steps of computing a plurality of line averages for a first image; identifying a set of pairs of line averages having high edge strengths; identifying a set of maximal pairs of line averages from among the set of line averages having high edge strength; expanding each of the maximal pairs of line averages into line stacks to form a set of line stacks; applying the set of line stacks to a second image so as to compute lines averages for the second image; shifting the line stacks to center the stacks on areas of highest edge strength and computing a distance between line stacks of the first and second images.

66 Claims, 17 Drawing Sheets

U.S. PATENT DOCUMENTS

| | | | |
|---|---|---|---|
| 6,449,608 B1 | 9/2002 | Morita et al. | |
| 6,462,768 B1 | 10/2002 | Oakley | |
| 6,611,296 B1 * | 8/2003 | Nieuwenhuizen et al. | 348/625 |
| 6,643,387 B1 | 11/2003 | Sethuraman et al. | |
| 6,714,929 B1 | 3/2004 | Micaelian et al. | |
| 6,718,365 B1 | 4/2004 | Dutta | |
| 6,766,037 B1 | 7/2004 | Le et al. | |
| 6,774,917 B1 | 8/2004 | Foote et al. | |
| 6,792,575 B1 | 9/2004 | Samaniego et al. | |
| 6,850,651 B2 * | 2/2005 | Zaklika et al. | 382/275 |
| 6,891,891 B2 | 5/2005 | Pau et al. | |
| 7,031,555 B2 | 4/2006 | Troyanker | |
| 7,042,527 B2 | 5/2006 | Imai | |
| 7,042,639 B1 * | 5/2006 | McDowell | 359/398 |
| 7,043,078 B2 * | 5/2006 | Guleryuz | 382/180 |
| 7,080,392 B1 | 7/2006 | Geshwind | |
| 7,136,524 B1 | 11/2006 | Goh et al. | |
| 7,146,361 B2 | 12/2006 | Broder et al. | |
| 7,149,355 B2 * | 12/2006 | Kubota | 382/199 |
| 7,190,832 B2 * | 3/2007 | Frost et al. | 382/173 |
| 7,246,314 B2 | 7/2007 | Foote et al. | |
| 7,268,939 B1 * | 9/2007 | McDowell | 359/368 |
| 7,274,828 B2 * | 9/2007 | Wang et al. | 382/266 |
| 7,421,455 B2 | 9/2008 | Hua et al. | |
| 7,555,718 B2 | 6/2009 | Girgensohn et al. | |
| 2001/0049826 A1 | 12/2001 | Wilf | |
| 2002/0003900 A1 | 1/2002 | Kondo | |
| 2002/0114394 A1 | 8/2002 | Ma | |
| 2003/0088554 A1 | 5/2003 | Ryan et al. | |
| 2003/0097301 A1 | 5/2003 | Kageyama et al. | |
| 2003/0120652 A1 | 6/2003 | Tifft | |
| 2004/0013305 A1 | 1/2004 | Brandt et al. | |
| 2005/0179814 A1 | 8/2005 | Pau et al. | |
| 2005/0216851 A1 | 9/2005 | Hull et al. | |
| 2005/0275626 A1 | 12/2005 | Mueller et al. | |
| 2006/0122997 A1 | 6/2006 | Lin | |
| 2006/0291567 A1 | 12/2006 | Filippini et al. | |
| 2007/0078832 A1 | 4/2007 | Ott, IV et al. | |
| 2007/0157239 A1 | 7/2007 | Wang et al. | |
| 2007/0185858 A1 | 8/2007 | Lu et al. | |
| 2008/0021710 A1 | 1/2008 | Ho | |
| 2008/0080743 A1 | 4/2008 | Schneiderman et al. | |
| 2008/0086688 A1 | 4/2008 | Chandratillake et al. | |
| 2008/0118107 A1 | 5/2008 | Sharon et al. | |
| 2008/0118108 A1 | 5/2008 | Sharon et al. | |
| 2008/0120290 A1 | 5/2008 | Delgo et al. | |
| 2008/0120291 A1 | 5/2008 | Delgo et al. | |
| 2008/0120328 A1 | 5/2008 | Delgo et al. | |
| 2008/0154889 A1 | 6/2008 | Pfeiffer | |
| 2008/0159622 A1 | 7/2008 | Agnihotri et al. | |
| 2008/0193017 A1 | 8/2008 | Wilson et al. | |
| 2008/0292187 A1 | 11/2008 | Eitan et al. | |
| 2008/0292188 A1 | 11/2008 | Ettan et al. | |
| 2009/0141940 A1 | 6/2009 | Zhao et al. | |
| 2010/0057694 A1 | 3/2010 | Kunjithapatham et al. | |
| 2010/0070483 A1 | 3/2010 | Delgo et al. | |
| 2010/0070523 A1 | 3/2010 | Delgo et al. | |
| 2010/0082585 A1 | 4/2010 | Barsook et al. | |
| 2010/0104261 A1 | 4/2010 | Liu et al. | |
| 2010/0205203 A1 | 8/2010 | Anderson et al. | |

FOREIGN PATENT DOCUMENTS

| | | |
|---|---|---|
| EP | 1152621 | 11/2001 |
| EP | 1732329 | 12/2006 |
| JP | 6105211 | 4/1994 |

OTHER PUBLICATIONS

Delgo at al., U.S Office Action mailed on Aug. 27, 2009 directed at U.S. Appl. No. 11/687,300; 55 pages.

International Search Report and Written Opinion mailed on Aug. 24, 2009 directed at application No. PCT/US2009/50409; 11 pages.

Polimeni, J. et al. "Space-time Adaptive Image Representations: Data Structures, Hardware and Algorithms," in Defining a Motion Imagery Research and Development Program workshop, Virginia's Center for Innovative Technology: published Nov. 20, 2001, located at <http://eslab.bu.edu/publications/proceedings/2001/polimeni2001space-time.pdf> visited on Aug. 13, 2009. 23 pages.

"Object Classification by Statistics of Multi-scale Edges Based on BD Integrals", Anonymous CVPR submission, Paper ID 1413, 1-6.

Borenstein et al., "Combining Top-Down and Bottom-Up Segmentation", 2004 Conference on Computer Vision and Pattern Recognition Workshop, 27-02 Jun. 2004, 1-8.

Borenstein et al., "Combining Top-Down and Bottom-Up Segmentation", Proceedings IEEE workshop on Perceptual Organization in Computer Vision, IEEE Conference on Computer Vision and Pattern Recognition, Washington, DC, Jun. 2004.

Bourke, Intersection Point of Two Lnes (2 Dimensions), http://local.wasp.uwa.edu.au/~pbourke/geometry/lineline2d/, (Apr. 1989), 1-2.

Brandt et al., "Fast Calculation of Multiple Line Integrals"; SIAM J. Sci. Comput., 1999,1417-1429, vol. 20(4).

Cai et al., "Mining Association Rules with Weighted Items", Database Engineering and Applications Symposium, 1998. Proceedings. IDEAS'98. International, Jul. 8-10, 1998, 68-77.

Corso et al., "Multilevel Segmentation and Integrated Bayesian Model Classification with an Application to Brain Tumor Segmentation", Medical Image Computing and Computer-Assisted Intervention (MICCAI), 2006, Appeared in Springer's "Lecture Notes in Computer Science".

Galun et al., "Texture Segmentation by Multiscale Aggregation of Filter Responses and Shape Elements", Proceedings IEEE International Conference on Computer Vision, 716-723, Nice, France, 2003.

Gorelick et al., "Shape Representation and Classification Using the Poisson Equation", IEEE Transactions on Pattern Analysis and Machine Intelligence, Dec. 2006, 1991-2005, vol. 28(12).

Gorelick et al., "Shape Representation and Classification Using the Poisson Equation", Proceedings IEEE Conference on Computer Vision and Pattern Recognition, Washington, DC, Jun. 2004.

Lee et al., "A Motion Adapative De-interfacing Method Using an Efficient Spatial and Temporal Interpolation", IEEE Transactions on Consumer Electronics, 2003, 1266-1271, vol. 49(4).

Lindley, "Creation of an MPEG-7 Feature Extraction Plugin for the platform METIS", Universität Wien/TU Wien, 2006, Betreuer: R. King, W. Klas.

Lucas et al., "An Iterative Image Registration Technique with an Application to Stereo Vision", Proceedings of Imaging Understanding Workshop, 1981, 121-129.

Sharon et al., "Completion Energies and Scale", IEEE Transactions on Pattern Analysis and Machine Intelligence, 2000, 1117-1131, vol. 22(10).

Sharon et al., "Fast Multiscale Image Segmentation" Proceedings IEEE Conference on Computer Vision and Pattern Recognition, I:70-77, South Carolina, 2000.

Sharon et al., "2D-Shape Analysis using Conformal Mapping", Division of Applied Mathematics, Brown University, 1-31.

Sharon et al., "2D-Shape Analysis using Conformal Mapping", International Journal of Computer Vision, Oct. 2006, 55-75, vol. 70(1).

Sharon et al., "2D-Shape Analysis using Conformal Mapping", Proceedings IEEE Conference on Computer Vision and Pattern Recognition, Washington, DC, 2004, 1-8.

Sharon et al., "Completion Energies and Scale", Proceedings IEEE Conference on Computer Vision and Pattern Recognition, 1997, 884-890, Puerto Rico.

Sharon et al., "Hierarchy and Adaptivity in Segmenting Visual Scenes", Nature, 2006, Jun. 28 online; Aug. 17 print, 1-4.

Sharon et al., "Segmentation and Boundary Detection Using Multiscale Intensity Measurements", Proceedings IEEE Conference on Computer Vision and Pattern Recognition, I:469-476, Kauai, Hawaii, 2001.

Shi et al., "Good Features to Track," 1994 IEEE Conference on Computer Vision and Pattern Recognition (CVPR'94), 1994, 593-600.

Tao et al., "Weighted Association Rule Mining using Weighted Support and Significance Framework", in: the Ninth ACM SIGKDD International Conference on Knowledge Discovery and Data Mining (ACM SIGKDD 2003), Aug. 24-27, 2003, Washington DC, USA.

International Search Report and Written Opinion issued for PCT/US2007/024197; dated May 19, 2008; 5 pages.

International Preliminary Report on Patentability and Written Opinion dated Jun. 4, 2009 directed at related application No. PCT/US2007/024198; 5 pages.

International Search Report mailed on Sep. 22, 2008 directed at counterpart application No. PCT/US2008/64683;1 page.

Delgo et al., U.S Office Action mailed on Dec. 29, 2008 directed at U.S. Appl. No. 11/687,300; 52 pages.

Delgo et al., U.S Office Action mailed on Dec. 29, 2008 directed at U.S. Appl. No. 11/687,326; 54 pages.

Delgo et al., U.S Office Action mailed on Dec. 22, 2008 directed at U.S. Appl. No. 11/687,290; 52 pages.

Delgo et al., U.S Office Action mailed on Jul. 8, 2009 directed at U.S. Appl. No. 11/687,290; 57 pages.

Sharon et al., U.S. Office Action mailed Jul. 9, 2010, directed to related U.S. Appl. No. 11/802,498; 8 pages.

Aji, et al. (2000). "The Generalized Distributive Law", *IEEE Transactions on Information Theory* 46(2):325-343.

Bhattacharyya. (1943)."On a measure of divergence between two statistical populations defined by their probability distributions", *Bulletin of the Calcutta Mathematical Society* 35: 99-109. MR0010358.

International Search Report and Written Opinion issued for PCT/US2007/024199; Dated: May 22, 2008; 9 Pages.

Lowe, "Object recognition from local scale-invariant features". (1999).

Mikolajczyk et al., "A performance evaluation of local descriptors". (2005).

Ng et al., "On Spectral Clustering: Analysis and an algorithm," 2001. http://citeseerx.ist.psu.edu/viewdoc/summary?doi=10.1.1.19.8100.

Okuma et al., A boosted particle filter: Multi-target detection and tracking, ECCV, 2004. http://www.springerlink.com/content/wyf1nw3xw53xjnf3/.

Rabiner "A tutorial on Hidden Markov Models and selected applications in speech recognition". (Feb. 1989).

Viola et al., "Rapid object detection using a boosted cascacd of simple features," Proc. Computer Vision and Pattern Recognition, 2001.

Sharon et al., U.S. Office Action mailed Aug. 26, 2010, directed to U.S. Appl. No. 11/687,261; 25 pages.

Sharon et al., U.S. Office Action mailed Aug. 26, 2010, directed to U.S. Appl. No. 11/687,341; 28 pages.

Sharon et al., U.S. Office Action mailed Mar. 23, 2011, directed to U.S. Appl. No. 11/687,261; 12 pages.

Sharon et al., U.S. Office Action mailed Mar. 23, 2011, directed to U.S. Appl. No. 11/687,341; 14 pages.

Delgo et al., U.S. Office Action mailed Mar. 23, 2011, directed to U.S. Appl. No. 12/502,202; 42 pages.

Delgo et al., U.S. Office Action mailed Mar. 29, 2011, directed to U.S. Appl. No. 12/502,206; 17 pages.

\* cited by examiner

LINE INTEGRAL CALCULATION UP TO LEVEL "M"

FOR VERTICAL (j:=x; k:=y) AND FOR HORIZONTAL (k:=x; j:=y), ASSUMING THE IMAGE ORIGIN POSITION (0,0) IS AT TOP LEFT: —201

FOR L = 0 (THE PIXEL LEVEL): —202

FOR EACH POSITION (j,k) WITH VALUE $v^{L=0}$ —203

FOR EACH POSITION (uv) FROM (j,k+1) to (j+1, k+1) WITH VALUE $v^{L=0}$ —204

IF INDEX OUT OF BOUND, MARK OUT OF BOUNDS —205

COMPUTE AND STORE $(v^{L=0}+v^{L=0})/2$ —206

COPY STORED VALUES TO NEW GRID OF SAME SIZE —207

FOR EACH LEVEL L=1 TO L=M —208

FOR EACH GRID POSITION (j,k=ODD) WITH VALUE $v^L,(j,k)$ —209

FOR POSITION FROM (u,v) = (j-($2^L$-1), k+2) TO (u,v) = (j+$2^L$, k+2) WITH VALUE $v^L,(u,v)$ —210

IF INDEX OUT OF BOUND, MARK OUT OF BOUNDS —211

IF u IS ODD, STORE $(v^L,(j,k) + v^L,(ceil(u/2), v-1) + v^L,(floor(u/2),v-1) + v^L,(u,v))/4$ —212

ELSE COMPUTE AND STORE $(v^L,(i,j) + v^L,(u,v))/2$ —213

COPY STORED VALUES TO NEW GRID THAT ELIMINATES EVEN k's —214

FIG. 2

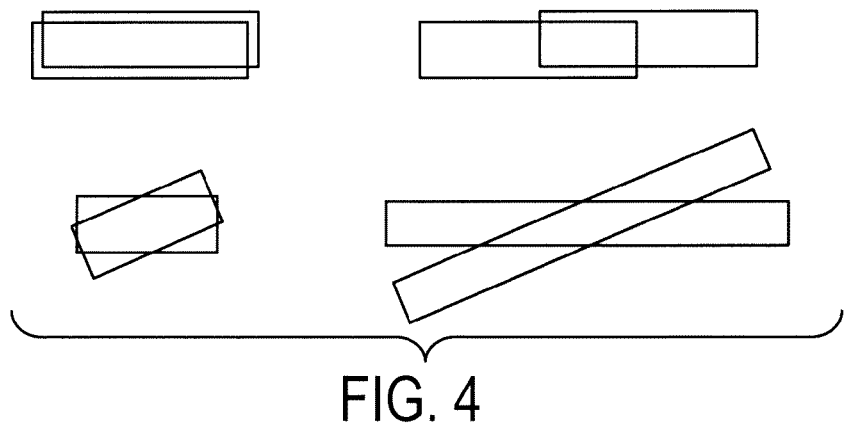
FIG. 4
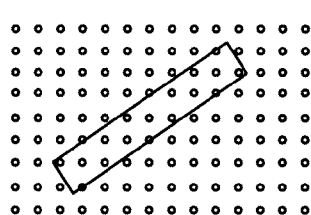
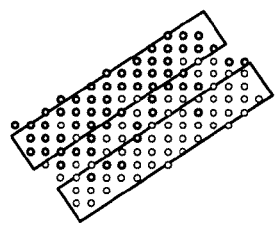
FIG. 5a    FIG. 5b
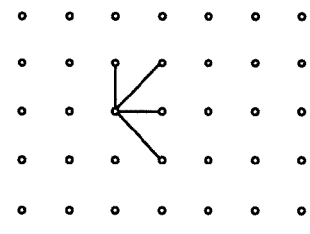
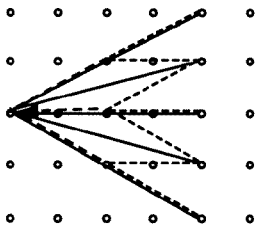
FIG. 5c    FIG. 5d
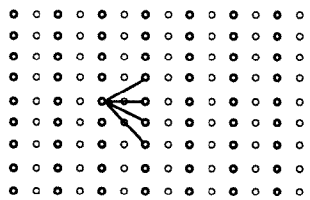
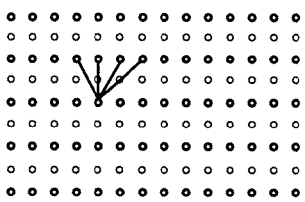
FIG. 5e    FIG. 5f
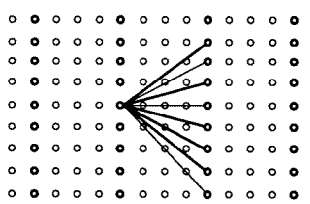
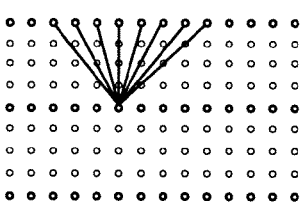
FIG. 5g    FIG. 5h

APPARATUS FOR AND METHOD OF ROBUST MOTION ESTIMATION USING LINE AVERAGES

CROSS REFERENCE TO RELATED APPLICATIONS

This application claims priority of U.S. Provisional Application Nos. 60/869,271 entitled Rexee "Video Aboutness" Search and 60/869,279 entitled Robust Motion Estimation Using the Brandt-Dym Line Averages filed Dec. 8, 2006 and 60/866,552 entitled Apparatus for and Method of Providing Interactive Video Content filed Nov. 20, 2006; U.S. patent application Ser. No. 11/687,290 entitled Apparatus for Performing a Weight-Based Search; Ser. No. 11/687,300 entitled Method of Performing a Weight-Based Search; Ser. No. 11/387,326 entitled Computer Program Implementing a Weight-Based Search; Ser. No. 11/687,261 entitled Method of Performing Motion-Based Object Extraction and Tracking in Video; and Ser. No. 11/687,341 entitled Computer Program and Apparatus for Motion-Based Object Extraction and Tacking in Video (all filed Mar. 16, 2007), all of the previously cited provisional and non-provisional applications being incorporated herein by reference in their entireties.

FIELD OF THE INVENTION

The invention is directed to image processing to detect motion and, more particularly, to creating motion vectors describing the movement of objects among frames of a video.

BACKGROUND

The prior art includes various methods and systems directed to processing images to identify motion of objects within images of a video. However, a more robust method is required to efficiently and accurately identify object motion.

SUMMARY OF THE INVENTION

Embodiments of the invention are directed to methods, software and apparatus for providing an enhanced technique for calculating robust local estimations of motion of objects in a videos or movies between consecutive images ('frames'). The motion is computed for all image locations in which a strong intensity gradient is present ('edges'), be it the boundaries of objects or edges which are internal to the objects, such as in texture. An approach according to one embodiment of the invention is based on Brandt-Dym ('BD') line averages which is an efficient multi-scale algorithm for computing averages of image intensities along various straight lines in an image at multiple-scales (lengths, widths) and orientations, and runs in time $24N \log_2 l_{max}$, where N is the number of pixels and $l_{max}$ (maximal 'length') is the number of lattice intervals spanned by the longest line average of interest. However, other methods of obtaining like averages may be used depending on system requirements. After having computed all significantly different such line averages for two consecutive images of a video or movie frames, motion of all significant edges between the frames is computed. Finally the discovered edges motion are transferred and related onto the image pixels around these edges followed by collecting together groups of neighboring image pixels which are consistent with a similar motion, hence ending up discovering the moving regions and objects.

According to an aspect of the invention, a method of processing an image comprises the steps of computing a plurality of line averages for a first image; identifying a set of pairs of line averages having high edge strengths; identifying a set of maximal pairs of line averages from among the set of line averages having high edge strength; expanding each of the maximal pairs of line averages into line stacks to form a set of line stacks; applying the set of line stacks to a second image so as to compute lines averages for the second image; and computing a distance between line stacks of the first and second images.

According to a feature of the invention, the step of identifying the set of pairs of line averages having high edge strength operates by forming clusters of the pairs of line averages having high edge strength and the step of identifying a set of maximal pairs of line averages includes eliminating from each of the clusters line averages having adjacent pairs with a higher edge strength.

According to another feature of the invention, the step of identifying the set maximal pairs of line averages includes suppressing non-maximal pairs of the set of pairs of line averages having high edge strengths by eliminating pairs having any adjacent pairs with higher edge strength.

According to another feature of the invention, the first and second images are part of a sequence of video images.

According to another feature of the invention, the method further includes a step of translating each of the line stacks of the second image in a direction corresponding to the computed distances.

According to another feature of the invention, the step of translating includes shifting each of the line stacks in a direction orthogonal to lines of the line stack by a distance equal to respective computed distances to center each of the line stacks on respective areas of highest edge strength According to another feature of the invention, the step of translating includes centering the line stacks of the second image on respective areas of highest edge strength.

According to another feature of the invention, the method may further include a step of verifying that all line averages fit to true object motion by compensating for edge movement internal to an object.

According to another feature of the invention, the step of computing the plurality of line averages includes implementing a Brandt-Dym method to compute the line averages.

According to another feature of the invention, the step of computing a plurality of line averages for the first image includes computing line averages for sets of line averages, each set having line averages of different geometries.

According to another feature of the invention, the different geometries include differences based on line length, width, angular orientation or relative position of lines of the pairs of line averages of the first image.

According to another feature of the invention, the step of computing a plurality of line averages for the first image includes computing line averages across different geometries of lines selected from the group consisting of different line (i) lengths, (ii) widths, (iii) angular orientations, and (iv) positions.

According to another feature of the invention, the step of computing a plurality of line averages for the first image includes computing an average color intensity value for a plurality of pixels defined by each of the line averages.

According to another feature of the invention, the step of computing a plurality of line averages for the first image includes computing line averages each spanning a plurality of pixel elements arranged in a rectangular array.

According to another feature of the invention, the step of identifying the set of pairs of line averages having high edge strengths includes a step of determining an intensity difference between line averages of each of the pairs of line averages.

According to another feature of the invention, the step of determining an intensity difference includes steps of determining an average pixel intensity of each line average of a pair of the line averages and subtracting the average pixel intensities to produce an edge intensity corresponding to each of the pairs of the line averages.

According to another feature of the invention, the step of identifying the set of pairs of line averages having high edge strengths includes a step of determining whether a difference in average pixel intensity of neighboring lines satisfies a threshold condition.

According to another feature of the invention, the step of computing distance between line stacks of the first and second images includes generating a set of motion vectors describing a movement of edges between the first and second images.

According to another feature of the invention the size of the line stacks is variable, the method including as step of adjusting stack size when applied to the second image to optimize identification of edges and performance. Typical stacks may include 4, 8 and 16 lines, although other numbers may be employed.

According to another feature of the invention, the step of expanding each of the maximal pairs of line averages into the line stacks to form the set of line stacks includes: identifying, for each of the maximal pairs, a set of $2^n$ adjacent line averages wherein n is an integer value great than 1.

According to another feature of the invention, each of the sets of $2^n$ adjacent line averages include line averages taken over regions each having a major axis that is substantially parallel to that of the other regions of a set.

According to another feature of the invention, the step of expanding each of the maximal pairs of line averages into the line stacks to form the set of line stacks includes: outwardly expanding from a centralized one of the maximal pairs to include, within each of the line stacks, line averages of immediately adjacent lines.

According to another feature of the invention, upon computing or identifying an edge as a difference between lines of a pair of adjacent line averages, a check may be performed for statistical validity vis-à-vis internal point-wise statistical noise.

According to another aspect of the invention, a method of calculating motion vectors of an object included in a video includes the steps of identifying, within a first image of the video, pairs of line averages having strong differences indicating high edge strengths; suppressing non-maximal pairs of the pairs of line averages by eliminating ones of the pairs having adjacent pairs with higher edge strength leaving a plurality of remaining pairs of line averages; maximizing differences of the remaining pairs of the line averages to obtain local maximum edginess by adjusting line parameters length, width, angular orientation and location of pairs; expanding the remaining pairs of the line averages into line stacks of lines; applying the line stacks to a another image of the video; identifying, for each line stack within the other image, a line pair having maximum differences indicating highest edge strength within line stack; translating the line stacks within the other image in direction orthogonal to the line stack lines to center line stacks on respective areas of highest edge strength; and calculating motion vectors between original and translated line stack positions.

According to another aspect of the invention, an apparatus for processing an image includes a line averaging engine configured to compute a plurality of line averages for a first image; an edge detection engine configured to identify a set of pairs of line averages having high edge strengths; an edge extraction engine configured to identify a set of maximal pairs of line averages from among the set of line averages having high edge strength; a stack creation engine configured to expand each of the maximal pairs of line averages into line stacks to form a set of line stacks; a stack overlay engine configured to apply the set of line stacks to a second image so as to compute lines averages for the second image; and a motion detection engine configured to compute a distance between line stacks of the first and second images.

It is noted that the use of the term "engine" in describing embodiments and features of the invention is not intended to be limiting of any particular implementation for accomplishing and/or performing the actions, steps, processes, etc. attributable to the engine. An engine may be, but is not limited to, software, hardware and/or firmware or any combination thereof that performs the specified functions including, but not limited to, any using a general and/or specialized processor. Software may be stored in or using a suitable machine-readable medium such as, but not limited to, random access memory (RAM) and other forms of electronic storage, data storage media such as hard drives, removable media such as CDs and DVDs, etc. Further, any name associated with a particular engine is, unless otherwise specified, for purposes of convenience of reference and not intended to be limiting to a specific implementation. Additionally, any functionality attributed to an engine may be equally performed by multiple engines, incorporated into the functionality of another or different engine, or distributed across one or more engines of various configurations.

According to another feature of the invention, the edge detection engine is further configured to form clusters of the pairs of line averages having high edge strength; and the edge extraction engine is further configured to eliminate from each of the clusters line averages having adjacent pairs with a higher edge strength.

According to another feature of the invention, the edge extraction engine is further configured to suppress non-maximal pairs of the set of pairs of line averages having high edge strengths by eliminating pairs having any adjacent pairs with higher edge strength.

According to another feature of the invention, the first and second images are part of a sequence of video images.

According to another feature of the invention, a translating engine may be configured to translate each of the line stacks of the second image in a direction corresponding to the computed distances.

According to another feature of the invention, the translating engine is further configured to shift each of the line stacks in a direction orthogonal to lines of the line stack by a distance equal to respective computed distances to center each of the line stacks on respective areas of highest edge strength According to another feature of the invention, the translating engine is further configured to center the line stacks of the second image on respective areas of highest edge strength.

According to another feature of the invention, the translating engine is further configured to verify that all line averages fit to true object motion by compensating for edge movement internal to an object.

According to another feature of the invention, the line averaging engine is further configured to implement a Brandt-Dym method to compute the line averages.

According to another feature of the invention, the line averaging engine is further configured to compute line averages for sets of line averages, each set having line averages of different geometries.

According to another feature of the invention, the different geometries include differences based on line length, width, angular orientation or relative position of lines of the pairs of line averages of the first image.

According to another feature of the invention, the line averaging engine is further configured to compute line averages across different geometries of lines selected from the group consisting of different line (i) lengths, (ii) widths, (iii) angular orientations, and (iv) positions.

According to another feature of the invention, The apparatus according to claim 23 wherein the line averaging engine is further configured to average color intensity values for a plurality of pixels defined by each of the line averages.

According to another feature of the invention, the line averaging engine is further configured to compute line averages each spanning a plurality of pixel elements arranged in a rectangular array.

According to another feature of the invention, the edge detection engine is further configured to calculate an intensity difference between line averages of each of the pairs of line averages.

According to another feature of the invention, the edge detection engine is further configured to calculate an average pixel intensity of each line average of a pair of the line averages and subtract the average pixel intensities to produce an edge intensity corresponding to each of the pairs of the line averages.

According to another feature of the invention, the edge detection engine is further configured to determine a difference in average pixel intensity of neighboring lines satisfies a threshold condition.

According to another feature of the invention, the motion detection engine is further configured to generate a set of motion vectors describing a movement of edges between the first and second images.

According to another feature of the invention, the stack creation engine is further configured to identify, for each of the maximal pairs, a set of 2n adjacent line averages wherein n is an integer value great than 1.

According to another feature of the invention, each of the sets of 2n adjacent line averages include line averages taken over regions each having a major axis that is substantially parallel to that of the other regions of a set.

According to another feature of the invention, the stack creation engine is further configured to outwardly expand from a centralized one of the maximal pairs to include, within each of the line stacks, line averages of immediately adjacent lines.

According to another aspect of the invention, an apparatus for calculating motion vectors of an object included in a video comprises a line averaging engine configured to identify, within a first image of the video, pairs of line averages having strong differences indicating high edge strengths; an edge extraction engine configured to suppressing non-maximal pairs of the pairs of line averages by eliminating ones of the pairs having adjacent pairs with higher edge strength leaving a plurality of remaining pairs of line averages; a stack creation engine configured to expand the remaining pairs of the line averages into line stacks of lines; a stack overlay engine configured to apply the line stacks to a another image of the video; and a motion detection engine configured to: identify, for each line stack within the other image, a line pair having maximum differences indicating highest edge strength within line stack, translate the line stacks within the other image in direction orthogonal to the line stack lines to center line stacks on respective areas of highest edge strength, and calculate motion vectors between original and translated line stack positions.

According to another aspect of the invention, a computer program includes a computer usable medium having computer readable program code embodied therein for processing images, the computer readable program code including: computer readable program code for causing the computer to compute a plurality of line averages for a first image; computer readable program code for causing the computer to identify a set of pairs of line averages having high edge strengths; computer readable program code for causing the computer to identify a set of maximal pairs of line averages from among the set of line averages having high edge strength; computer readable program code for causing the computer to expand each of the maximal pairs of line averages into line stacks to form a set of line stacks; computer readable program code for causing the computer to apply the set of line stacks to a second image so as to compute lines averages for the second image; and computer readable program code for causing the computer to compute a distance between line stacks of the first and second images.

According to another aspect of the invention, a computer program includes a computer usable medium having computer readable program code embodied therein for calculating motion vectors of an object included in a video, the computer readable program code including: computer readable program code for causing the computer to identify, within a first image of the video, pairs of line averages having strong differences indicating high edge strengths; computer readable program code for causing the computer to suppress non-maximal pairs of the pairs of line averages by eliminating ones of the pairs having adjacent pairs with higher edge strength leaving a plurality of remaining pairs of line averages; computer readable program code for causing the computer to maximize differences of the remaining pairs of the line averages to obtain local maximum edginess by adjusting line parameters length, width, angular orientation and location of pairs; computer readable program code for causing the computer to expand the remaining pairs of the line averages into line stacks of lines; computer readable program code for causing the computer to apply the line stacks to a another image of the video; computer readable program code for causing the computer to identify, for each line stack within the other image, a line pair having maximum differences indicating highest edge strength within line stack; computer readable program code for causing the computer to translate the line stacks within the other image in direction orthogonal to the line stack lines to center line stacks on respective areas of highest edge strength; and computer readable program code for causing the computer to calculate motion vectors between original and translated line stack positions.

Additional objects, advantages and novel features of the invention will be set forth in part in the description which follows, and in part will become apparent to those skilled in the art upon examination of the following and the accompanying drawings or may be learned by practice of the invention. The objects and advantages of the invention may be realized and attained by means of the instrumentalities and combinations particularly pointed out in the appended claims.

BRIEF DESCRIPTION OF THE DRAWINGS

The drawing figures depict preferred embodiments of the present invention by way of example, not by way of limitations. In the figures, like reference numerals refer to the same or similar elements.

FIG. 2 is a flow chart of a method calculating a line integrals;

FIG. 4 is a diagram of relationships between neighboring line averages depicting changing overlapping conditions with changes in spatial and orientation differences;

FIGS. 5a-5h are diagrams of line averages taken over various pixel domains;

DETAILED DESCRIPTION OF THE PREFERRED EMBODIMENTS

Section 1. Introduction

We first introduce an algorithm for efficiently calculating edges in an image at multiple scales and orientations. The algorithm is based on the use of Brandt Dym (BD) line averages (see Brandt&Dym 1999), which we describe first below. The algorithm runs in time $24N \log_2 L_{max}$ where N is the size of the image and $L_{max}$ is the length in inter-pixel intervals of the longest line of interest. This algorithm has many potential uses for computer vision. In this disclosure, we illustrate its use for detecting the motion of edges.

We proceed as follows. In Section 2, 3 and 4 below we describe the BD line averages and how we can adapt them to compute edges at multi-scales and orientations in $O(N \log_2 L_{max})$ time. Sections 5 and 6 illustrate the use of the multi-scale line averages and edges for detecting motion between consecutive frames in various movies or videos. Section 7 includes actual test results for several types of videos and Section 8 a computer platform suitable for supporting processing according an embodiment of the invention.

Figure 1:
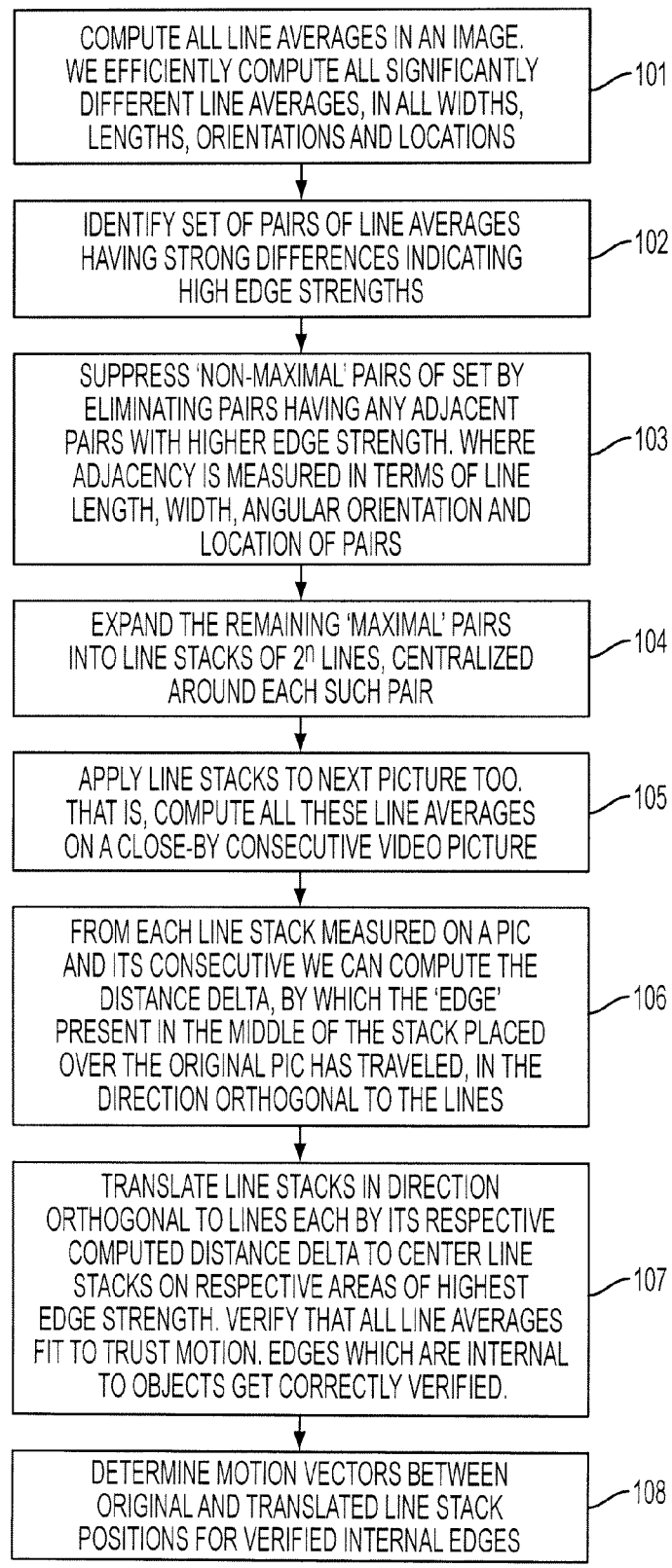
FIG. 1 is a flow chart of a method of processing images or pictures of a video or movie to identify edge and object movement according to an embodiment of the invention.

A method according to an embodiment of the invention is depicted in the flow chart of FIG. 1. At step 101 a plurality of line averages are computed for an image. This may include segmenting the image into a plurality of rectangular areas, each area including some array of picture elements, e.g., pixels. For the purposes of the present example, these rectangular areas or arrays of pixels will be referenced as lines, a characteristic (e.g., single, multiple and/or total color intensity, saturation, luminosity, etc.) of the pixels averaged over the area termed a line average. However, the array need not be linear and may be in some other geometry (e.g., arcuate, hyperbolic, etc.) Further, although all pixels of a line (e.g., rectangular region) may be used to form an average, some subset of pixels may be selected. Thus, according to the present example, all line averages in an image are computed. This may include computing averages for lines of various and different widths, length, orientations and locations, each set of line averages spanning some portion or all of the image. According to one embodiment, smaller line averages are used to calculate larger line averages using BD line averages.

At step 102 a set of pairs of line averages is identified, each pair having strong differences between the lines of the pair thereby indicating high edge strengths (e.g., satisfying some threshold differential value). That is, large differences in the values of adjacent line averages indicate that there is an intervening edge, the larger the change in value the larger the edge strength. This step may include subtraction of line average values of adjacent lines (i.e., lines of the pair) to identify changes in line averages having at least some threshold value.

Step 103 is directed to identifying and selecting pairs of line averages having peak edge strength. According to an embodiment of the present example, regions of an image are represented by line pairs of various length, width, angular orientation, position, etc. Thus, if edge strength is greater for the longer of two line averages, the longer is selected and the shorter eliminated from the set. Similarly, if a line pair corresponding to some incremental translation or rotation of the constituent lines has a greater edge strength, the translated (adjacent) or rotated pair is maintained and the non-rotated eliminated. Thus, adjacent line configurations are processed to identify local maximum edge strength values. This may be accomplished by eliminating or suppressing 'non-maximal' pairs of each set by eliminating pairs having any adjacent pairs with a higher edge strength wherein adjacency is measured in terms of some incremental line length, width, angular orientation and location of adjacent pairs.

Upon computing the edge as a difference between line averages of a pair of adjacent line average, a statistical validity check of the edge value may be performed. The check is performed vis-à-vis the internal point-wise statistical noise that may be present within the computation of each of the two line averages (coming from the pixel-level signal/values/intensities, e.g. white noise or a "salt-and-pepper" type of noise.) According to one embodiment, a line-average point-wise noise is calculated together with the line averages. The difference between the lines is matched to check for edge validity to thereby overcome the present pixel level noise.

Step 104 expands the remaining 'maximal' pairs into line stacks. According to one embodiment of the invention, each of the line stack includes $2^n$ lines centralized about a corresponding pair of maximal pair of lines used to form the line averages. Note that, while the embodiment of the present example describes the line stack as having a power or two number of lines, any suitable number of lines may be included within and/or as part of a line stack. Further, embodiments of the invention may implement a variable number of line averages constituting each stack, the number of line averages statically or dynamically selected to optimize performance. Factors may include image resolution, size, number of intervening frames between the images analyzed (if any), speed of object motion accuracy required, processing resources available, and other factor affecting system performance requirements. Embodiments of the invention may include automatic and/or manual adjustments w/stack size including based on best fit criteria. Typical sizes of stacks include 4, 8 and 16 lines, although other sizes may be used.

At step 105 the line stacks are applied to a next image or picture so as to identify corresponding lines within the next image or picture. According to one embodiment, the next image is a subsequent or prior image of a series of images that, together with the first or original image, form a portion of a scene of a video. Although the next image may be the immediately next or prior image, it may be any appropriate number of image sequences distant from the original image in view of the object motion to be detected. At step 106 a movement amount, e.g., delta distance, from each line stack measured on an image and a consecutive image is computed by which the 'edge' present in the middle of the stack placed over the original image has traveled, in the direction orthogonal to the lines. At step 107 the line stacks in the second image are translated (or otherwise shifted and/or reoriented, etc.) in (according to the present example) a direction orthogonal to the lines of the stack by a distance amount computed to center the line stacks on respective areas of highest edge strength in the second image.

At 109 a determination is made of those motion vectors describing object movement between the original and translated line stack positions for verified internal and/or external edges of an object.

Figure 3:
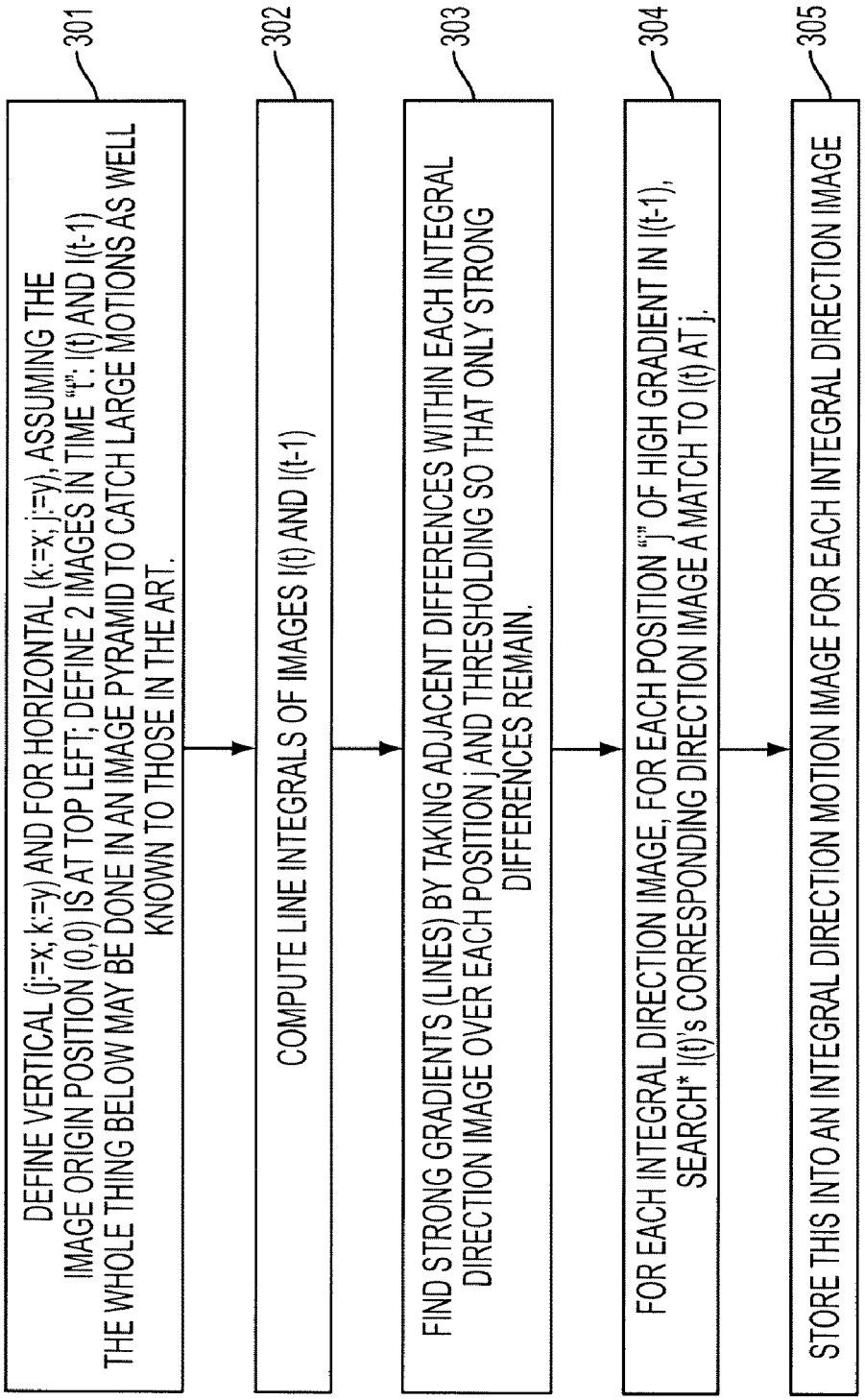
FIG. 3 is a flow chart of a method of calculating motion.

FIGS. 2 and 3 are flow charts of a method of generating line integrals or averages over elements of an image and calculating a motion vector. FIG. 2 depicts steps for performing a line integral calculation up to level "M" while FIG. 3 calculating a line integral for motion calculation.

The following definitions are applicable to the steps depicted in FIGS. 2 and 3: First (pixel level) is level 0 "L0". We consider here only powers of 2 grid shrinkage, other powers are possible as could be derived by those versed in the art (simple math on logs and powers). We consider the flow chart in terms of position (j,k) where "our" axis is "j" and the other axis is "k" (the axis that shrinks). That is, for vertical, position "j" would be along the x axis, shrinkage with level would be along the y axis which is indexed by k; For horizontal, "j" would be along the y axis and the x axis, indexed by k would shrink by a factor of 2 each level we go up.

Referring to FIG. 2, step 201 implements a loop using a "for" statement to address pixels of an image: For vertical (j:=x; k:=y) and for horizontal (k:=x; j:=y), assuming the Image origin position (0,0) is at top left. At 202 line length L is initialized to zero where 0 is the finest granularity, i.e. wherein 'line=pixel' level). An next inner loop is initiated at 203 for each position (j,k) with value vL=0 wherein v is the (j,k) line-average value. Step 204 implements the psuedocode instruction "For each position (u,v) from (j,k+1) to (j+1,k+1) with value $V^{l=0}$". At step 205 a check is performed to see if the index is out of bound and, if so, an appropriate out of bound mark is set. Step 206 computes a first level of shortest lines from pixels by calculating and storing $(v^{L=0} + V^{L=0})/2$. At the completion of all loops, step 207 copies the resultant stored values to a new grid of the same size. Step 208 consecutively computes longer line levels from the previously computed shorter ones, initiating a loop incrementing L from 1 to M. Over this range, for each grid position wherein k is odd, ks are persisted at higher levels at step 209. Step 210 addresses the grid such that, for position (u,v)=(j−(2L−1),k+2) to (u,v)=(j+2L,k+2) with value $V^{L,(u,v)}$. Step 211 checks for completion by testing for an out of bounds condition. Otherwise, at step 212, intermediate orientations are computed; longer lines mean half k locations, and twice orientations: If u is odd, store $(v^{L,(j,k)} + V^{L,(ceil(u/2)v-1)} + V^{L,(floor(u/2)v-1)} + V^{L,(uv)})/4$. If u is even, then step 213 computes and stores longer lines of the same orientation: $(v^{L,(i,j)} + V^{L,(uv)})/2$. Step 214 stores the values to a new grid in which the even ks have been eliminated. The process then loops back and continues.

FIG. 3 is a flow chart for forming line integrals for motion calculation. At step 301 vertical and horizontal indices are initialized: vertical—(j:=x; k:=y) and horizontal—(k:=x; j:=y) wherein an image origin position (0,0) is at top left. Two images in time are also defined: "t": I(t) and I(t−1). The subsequent steps 302-305 may be performed in an image pyramid to catch large motions as would be understood by those skilled in the art. At step 302 the line integrals of images I(t) and I(t−1) are computed. Step 303 finds strong gradients (lines) by taking adjacent differences within each integral direction image over each position j and thresholding so that only strong differences remain. At step 304, for each integral direction image and for each position "j" of high gradient in I(t−1), a search of I(t)'s is performed in a corresponding direction image to match to I(t) at j. Step 305 stores this data into an integral direction motion image for each integral direction image.

In the current example, line integrals work on neighboring grid points where a "neighbor" is only considered in the direction of interest. The "grid points" at the first level (level 0) are the pixel values. Line integrals are symmetric, so there are 4 unique directions at level 0)(see, e.g., FIG. 5c). For power of 2 grids as shown in FIG. 5, each higher level has twice as many possible neighbors. For computational convenience, we treat horizontal directions (FIG. 5e) and vertical directions (FIG. 5f) separately. These are the "directions of interest" which defines neighbors as mentioned above.

Each higher level shrinks the grid in the direction of interest; FIG. 5 shows power of 2 shrinkage, where the information from the level below is summarized to even (or odd) points either horizontally (FIGS. 5e, 5g) or vertically (FIGS. 5f, 5h); the odd (or even) points are removed and further averaging is done among now twice as many neighbors in the direction of interest.

Section 2. Preliminary Considerations

Given an image, an edge element is produced by selecting a filter of a certain length l and width w and convolving the filter with the image at a certain position and orientation. The result of this convolution is a scalar value, referred to as the response of the filter. An edge filter may, for example, measure the contrast along its primary axis, in which case its response represents the "edgeness level", or the likelihood of the relevant sub area of the image to contain an edge of (l, w) scale. Similarly, a filter may indicate the existence of fiber-like shapes in the image, in which case its response represents the "fiberness level" of the relevant subarea of the image. In addition, such a filter may be readily designed to measure the level of point-wise noise present in other filters of this sort as we show in Section 4. Below we use the term "straight responses" to refer to the responses obtained by convolving the image with either an edge or a fiber filter.

Consider now the edge elements obtained by convolving the image with a filter of some fixed "length" l and "width" w.

Every edge element now is positioned at a certain pixel P and is oriented in a certain orientations ψ, where $0 \leq \psi \leq \pi$ is measured from the right-hand side of the x-axis.

The number of edge elements required to faithfully represent the image at this scale depends on l and w. Thus, long and thin elements require finer resolution in orientation than square elements. In fact, the orientational resolution required to sample significantly different orientations increases linearly with l/w (see Brandt&Dym 1999). Similarly, elements of larger size require less spatial resolution than elements of smaller size. Brandt and Dym (Brandt&Dym 1999) use these observations in order to introduce a very efficient computation (O (N log N), where N is the number of pixels in the image) of all significantly different edge elements.

Section 3. Constructing the BD Multilevel Line Averages

Referring to FIG. 4 it can be seen that an overlap between neighboring line averages changes with their spatial and orientation differences. Note that same orientation difference results in larger integration domain differences when the line averages are longer, and hence longer line averages naturally demand higher angular resolution for measuring all significantly different line averages in the image. On the other hand, longer line averages require measuring on less spatial locations. The Brandt and Dym computation exploits these facts for a recursive fast construction of all significantly different line averages in the image.

An important aspect of the Brandt and Dym (BD) algorithm for computing straight intensity level line averages in an image is the recognition that the 2D image structure allows computing all significantly different line averages simultaneously, by an efficient recursive procedure composing long line averages out of already computed shorter ones. J. Dym's Dym's thesis (1994) describes that this can be performed rapidly, in a way which does not violate the accuracy of the integration computation for each specific integral. The method produces a full multilevel set of line averages, in "all" scales and orientations out of which any other desired integral, in any scale or orientation may be computed sufficiently accurately by interpolating the already computed integral values. To be precise, the fast integration error is smaller than the error already inherently introduced by having the image as a discrete measurement of a continuous world signal.

Let $n=n(l, w)$ be the number of sites (P), and $m=m(l, w)$ the number of orientations Ψ at each site, that are required in order to describe all the l×w straight responses that are significantly different from each other. It can be shown (see Brandt&Dym 1999) that if l and w are measured in pixel units then, for any N-pixel picture, $n=O(N/(lw))$ and $m=O(l/w)$, so the total number of l×w elements is $O(N/w^2)$ (see FIG. 1). Hence, for any geometric sequence of scales (e.g., l=1,2, 4, . . . , $l_{max}$ and w=1,3,9, . . . ) the total number of straight elements is $O(N \log l_{max})$. It has been shown (in Brandt&Dym 1999) that all the responses at all these elements can be calculated in only $O(N \log l_{max})$ computer operations, using a multiscale algorithm that constructs longer-element responses from shorter ones. In practice $l_{max} \leq 64$.

We next demonstrate how to construct all straight line averages of the image intensity levels in about $24N \log l_{max}$ computer operations (cf. Brandt&Dym 1999), for the case of one-pixel wide line averages (w=1), and all significantly different lengths and orientations. In particular, we generate a geometric sequence of length scales In particular, we generate a geometric sequence of length scales l=1,2,4, . . . , $l_{max}$, where $l_{max}$ is at most the image size (about $\sqrt{N}$). The line averages of length scale l=1 are kept for four orientations at every pixel in the image. Whereas whenever doubling a length scale by two we keep the line averages for twice as many orientations, and at half the locations (pixels) in the image. Thus, following Brandt&Dym (1999) we construct a dense set of line averages which overall captures all significantly different line averages in the image.

The method consists of recursive construction of longer line averages by interpolation out of (averaging) shorter line averages already computed. FIG. 5(d) exemplifies this construction, constructing the dark line averages of length 4 out of the dotted and dashed lines averages of length 2 already computed. For the length-4 orientations which already existed in the length-2 scale we simply compute every length-4 integral by averaging the values of its two composing length-2 sub-line-averages (a dashed one and a dotted one). Whereas for the length-4 orientations which did not exist in the length-2 scale we need to interpolate (average) the value of each length-4 integral out of 4 different length-2 line averages, two dashed ones and two dotted arranged in a parallelogram around it as appears in FIG. 5(d).

FIG. 5 illustrates eight situations in the corresponding drawings, as follows:

FIG. 5(a): An illustration of a line integral pixel domain.

FIG. 5(b): An illustration of a difference between two adjacent line averages of the same orientation showing the fuzzy oriented transition in pixel color to be detected.

FIG. 5(c): The line averages of length 1 measured at each pixel.

FIG. 5(d): The recursive building of the longer line averages out of the shorter line averages by line interpolation.

FIG. 5(e): The horizontal line averages of length 2 measured at only half the horizontal locations.

FIG. 5(f): The vertical line averages of length 2 measured at only half the vertical locations.

FIG. 5(e): The horizontal line averages of length 4 measured at only one quarter of the horizontal locations.

FIG. 5(f): The vertical line averages of length 4 measured at only one quarter of the vertical locations.

The reason this "simple" straightforward recursive line integral construction is mathematically valid, and approximates the direct computation of each of these line averages from the original image was carefully studied in Brandt&Dym 1999. It is shown there that the error in computing the longer line averages out of the shorter line averages in such a fast recursive way is smaller than the error inherently present in computing long line averages in any computer image, in respect to the real continuous value of the integral in the physical observed signal. That is, for computing any integral that does not lie directly on image pixels we have to numerically interpolate the pixel intensity values and numerically integrate them, and this involves certain discretization errors with respect to the continuous integral value, which are larger than the error introduced by the fast recursive method for obtaining all line averages.

Section 4. From BD Multilevel Line Averages to Multilevel Line Edges; Edges are Adaptively Measured to be Significant with Respect to the Noise Present.

In Brandt&Dym 1999 only line averages were computed and not any edges or line integral differences. In fact this set of line averages can easily be transformed into a set of edge elements by taking differences between neighboring line averages with the same size and orientation. We define an edge "around" each integral as half the absolute value of the difference between the two line averages with the same orientation which are spatially adjacent to it on both its sides. The spatial distance between each two such parallel line integral which are subtracted from each other to produce an edge is thus exactly two pixels. Each integral (and therefore each edge) is either centered at an image pixel or centered at the midpoint (equidistance) between two image pixels.

Note that line-integral edge-measurement significance, with respect to the noise present in the image: In order to verify that the difference between two neighboring line averages ('edge') is significant, we compare this difference to the statistical noise present along each of the line averages composing that edge. We present an improved method according to various embodiments of the invention for computing the point-wise line-integral noise along each of the line averages, and integrate this information to generate a new definition of a 'line-integral edge', adaptively tuned to be significant over noise, again with a computational cost O (N log $1_{max}$).

Line-integral point-wise noise: since the line averages are averages of the intensities along the line it is tempting to think that the noise in these measurements can be modeled nicely by the variance along the line, and indeed such variance may be easily measured by using the formula Var(I)=$\sigma^2$=⟨$I^2$⟨−⟩I⟩$^2$, where I is the intensity of the image. (This means that if we measure the line averages on $I^2$: an image containing the squared intensity at each pixel, where I represents the original image intensities—we could then compute Var(I) for every line average from the above formula, just doubling the cost needed for computing all line averages). However, the intensity profile along the line may be smoothly changing to still give a large variance, whereas the line averages point-wise noise will be low in such a case. We therefore define the line-integral point-wise noise to be related to the non-smoothness in the intensity profile along the line, namely defined to be the average of the squares of the intensity differences between nearest-neighboring pixels along the line.

Computing the line-integral point-wise noise, $\sigma$, is another process which is similar to computing the line averages and can run in parallel to it. In computing the line averages we start again with the finest integration level for the shortest lines of length 2 pixels (see FIG. 5(c)), just like with the line averages. The line averages computed there are nothing but the average value of the two point/pixels composing each such line; we then continue by averaging these short lines into longer line averages, and still longer line averages recursively. For computing the line-integral point-wise noise all we need to change in such a process is the finest level of computing the average of the two neighboring pixels (FIG. 5(c)) into computing their squared difference. From there on everything continues just the same, averaging these differences into longer lines etc, and results in the desired average of the squares of differences of neighboring pixels along each line. The square root of this is called the noise along the line, denoted $\sigma$.

Assume we compute the edge by subtracting line integral a from its neighboring same orientation line integral b both of "length" n, that is $$e := |a - b| = \left| 1/n \sum_{i=1}^{n} a_i - 1/n \sum_{i=1}^{n} b_i \right|,$$

where $\{a_i\}$, $\{b_i\}$ are the point-wise discretizations of lines a and b, respectively. We assume that we have computed the noise $\sigma_a$ and $\sigma_b$ for the two lines, respectively and that hence $\sigma:=\max(\sigma_a,\sigma_b)$ is the point-wise noise in e. Statistically then $e^2$ should be compared to the point-wise noise in it, $c(\sigma^2/n)$, for deciding its significance, where c is a parameter. That is check $$(a - b)^2 \overset{?}{\gg} c\left(\frac{\sigma^2}{n}\right) \qquad \text{Eq. (1)}$$

It should be noted that even if we assume $\sigma$ to be a constant in some region of the image we still need to check for significance that $e^2$ is larger than a constant proportional to 1/n (one over the line length).

We employ non-maximal suppression according to edge strength for keeping only the edge responses which are locally maximal in both spatial center location and orientation. This means that if a straight edge response has a stronger neighboring edge response in either of the two edges with the same orientation spatially adjacent to it on both its sides we do not keep it as an edge. We also do not keep an edge response if it has a stronger neighboring edge response in either of the two edges with adjacent orientations centered at the same pixel.

The multilevel construction of the edges also allows us to suppress long edges which do not have strong contrast all along their straight line support. Each edge is recursively composed out of two half-length edge parts measured on a half-length scale. It is therefore straightforward to keep a long edge response only if it is composed out of two semi-strong half-length responses and not keep it otherwise.

We name the salient edges remaining after the above filtering with respect to the line-integral point-wise noise and the suppressions 'maximal edges'.

Section 5. Computing Robust Local Motion Estimations Using Line Averages

When estimating the motion transformations objects undergo between consecutive movie frames or video images it is essential to focus first on the stable landmarks and features which are robust in nature under the large extent of possible motion transformations, and for which the most basic translation and rotation motion transformations between the frames can be estimated most reliably. Such robust features tend to be local in nature; for example a large variety of 'corner-like' intensity structures are generically present spread over all images (see for instance Lucas&Kanade 1981). Following the extraction of feature motion a step of feature grouping and integration is employed to assemble all such local feature motion into the more complex motion of the different larger and more structured objects present in the scene (composing for instance affine moti estimations).

Add "better features to track": Using the line averaging structure, we may easily find line segments as explained elsewhere herein. Once we have a region of line segments, we may compute their intersection using techniques such as explained in [Paul Bourke]. These actual line intersections may be used for tracking with iterative optical flow trackers such as the Lucas-Kanade tracker [Lucas Kanade]. Shi and Tomasi in their paper "Good Features to Track" [Shi Tomasi] showed that the Lucas-Kanade tracker works best with "corner" like features such as formed where two edges meet. In that work, corners were only implicitly found by computing areas in the image where there are two large eigen values of images gradients (which implies a meeting of two strong gradients). Using line segments found by our line averaging structure, we may explicitly find real line intersection corners to track. Such actual corner line intersection features work better than Shi and Tomasi's implicit corners and so our method may be termed "Better Features to Track".

Around each maximal edge (see Section 4) in an image A we will use the line averages computed for a neighborhood of this edge in both consecutive movie frames A and B for estimating the size of the motion this edge moved between the frames, in a direction orthogonal to its orientation. We denote this orthogonal motion by $\delta$, hence computing the $\delta$-motion for the maximal edges. The $\delta$-motion computation is depicted in FIG. 3 where the maximal edge is assumed to be around the middle line integral n/2.

Figure 6:
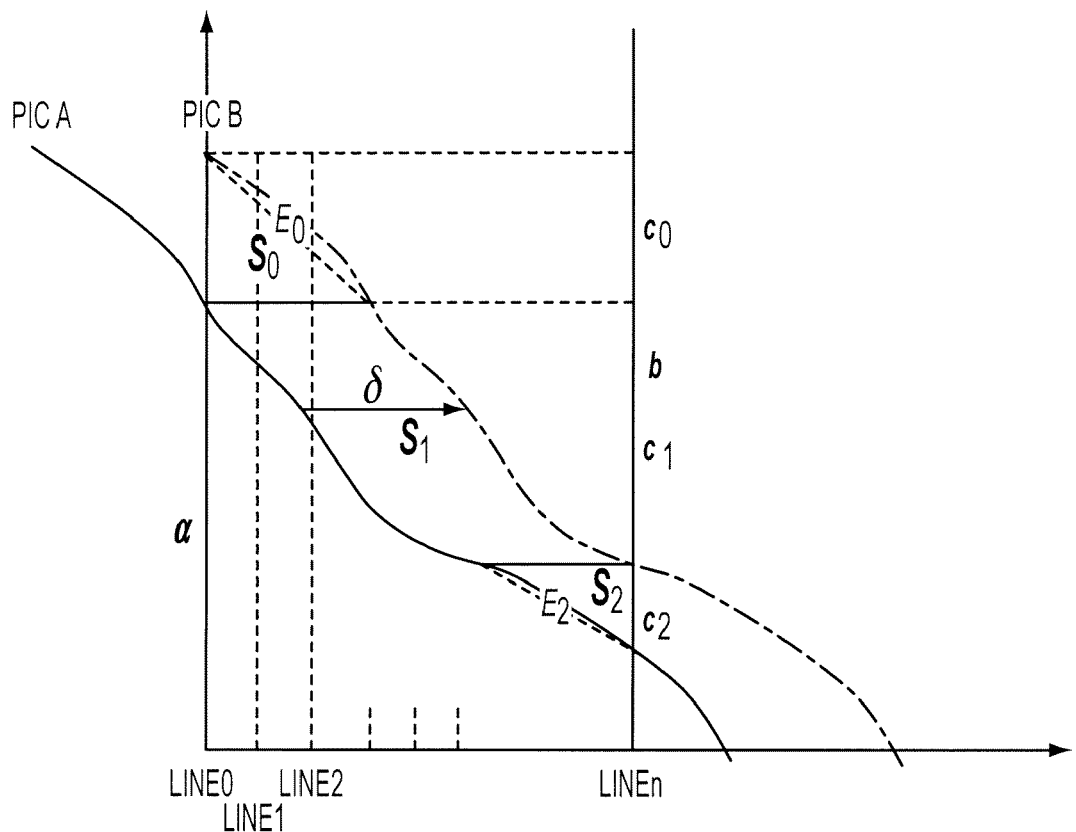
FIG. 6 is a diagram of line integral values taken over consecutive movie frames.

A reasonable assumption taken for the derivation of the $\delta$-motion of a maximal edge is that the intensity profiles representing the same edge in both images A and B are similar (plots 'Pic A' and 'Pic B' in FIG. 6). Moreover, we assume that since the intensity profile is considered around a maximal edge where the intensity drops between relatively constant values on both its sides it has some constant-gradient slopes before and after the main edge drop. That is, the intensity profiles in both images are approximated well by the constant slope as represented by the dashed lines in FIG. 6. Hence the areas of both triangles $S_0$ and $S_2$ approximate well the corresponding areas captured between the graphs 'Pic A' and 'Pic B' near line 0 and line n, within the domain captured between line 0 and line n.

We will approximate the $\delta$-motion (see FIG. 6) by integrating the area captured between the two curves Pic A and Pic B, assuming the $\delta$ shift between the two intensity curves is approximately fixed. We denote this area by S, for which we can write the integration by decomposing into three areas $$S = \int_0^n \text{Diff\_Of\_Pics\_A\_B} \simeq S_0 + S_1 + S_2$$

We denote the line averages by:
$a_i$—the value of line i computed on pic A
$b_i$—the value of line i computed on pic B And $S_A = \frac{1}{2}a_0 + a_2 + \ldots + a_{n-1} + \frac{1}{2}a_n$ $S_B = \frac{1}{2}b_0 + b_1 + b_2 + \ldots + b_{n-1} + \frac{1}{2}b_n$ hence we have from the line averages the integrated $S = S_B - S_A$
We next approximate S by $\hat{S}$ using the constant gradients assumption for ignoring the negligible areas $E_0$ and $E_2$ by approximating $S_0 \simeq \hat{S}_0 = \delta c_0/2$ and $S_2 \simeq \hat{S}_2 = \delta c_2/2$ which basically means that $S = \hat{S} + E_O - E_2$
Hence obtaining $$S \simeq \hat{S} := S_0 + \hat{S}_1 + \hat{S}_2$$
$$= \delta(c_1 + c_0/2 + c_2/2)$$
$$= \delta\left(\frac{c_1 + c_2}{2} + \frac{c_1 + c_0}{2}\right)$$
$$= \delta(a+b)/2$$

where $b = b_0 - b_n$ and $a = a_0 - a_n$;
out of which we can extract an $\hat{\delta}$ an approximation to $\delta$ by $$\hat{\delta} = \frac{2S}{a+b} \qquad \text{Eq. (2)}$$

In FIG. 6, the 1D black and red solid-line curves, denoted above by 'Pic A' and 'Pic B', describe each separately for both consecutive movie frames A and B (correspondingly) the one dimensional intensity profile (the y-axis values) for the same collection of neighboring, homogenously spaced same length and orientation 'train' of line averages computed on the image domain. The line integral values are depicted here as a function y(x) of the x-axis values representing the line averages 0 to n.

Section 6. A Correction to, Confidence in and Stability of the Computed $\delta$-Motion Once obtaining a $\hat{\delta}$ approximation to $\delta$ we are interested in applying a confidence to this measurement with respect to both the constant gradient assumption and the movie frames A and B, measured directly. For this we define $$S'_{-\delta} = S_A^{-\delta} - S_B \text{ and}$$

$$S'_{+\delta} = S_A^{+\delta} - S_B$$

And hence we suggest a correction to $\hat{\delta}$, compensating for the constant gradient assumption introduced by $$\delta' = \frac{S'_{+\delta} + S'_{-\delta}}{a_0 - a_n + b_0 - b_n}$$

to obtain $\hat{\delta}_{new} = \hat{\delta} + \delta'$ \qquad Eq. (3)

This step corrects $\hat{S}$ to better approximate S, now that we have an approximation $\hat{\delta}$ to $\delta$, by effectively considering also the remainders $E_0$ and $E_2$ (see FIG. 3).

The above correction holds under the following three reasonable assumptions, which if do not hold there's a very low confidence in the computed $\hat{\delta}$ anyhow:

$S'_{-\delta} \approx S'_{+\delta} |\delta'| << |\hat{S}|$ and $(a_0 - a_n) + (b_0 - b_n) > c(\sigma^2/n)$, following Eq. (1)

If the above assumptions hold a reasonable confidence measure can be defined as $$e^{-\beta \left|\frac{S'}{S}\right|}$$

where $S' = \max(S'_{+\delta}, S'_{-\delta})$ and $\beta$ is a positive parameter.

Figure 7:
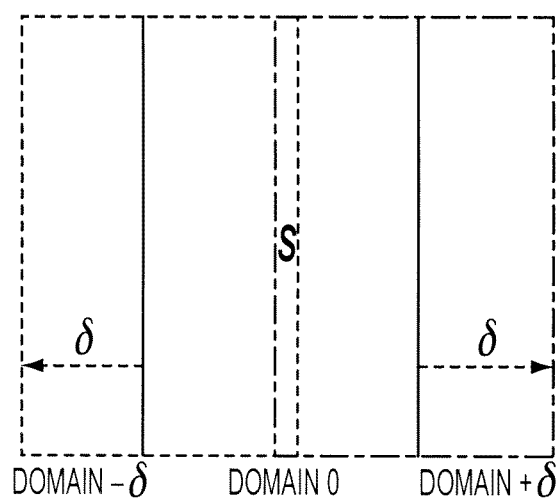
FIG. 7 is a diagram depicting a domain S computed out of line averages applied to a pair of movie frames.

With reference to FIG. 7, the domain depicted by the rectangular black frame is where S is computed out of line averages 0 to n applied to both movie frames A and B. We denote by $S^{\pm\delta}$ the domains shifted by $\pm\delta$, correspondingly. We denote by $S_A^{\pm\delta}$ and $S_B^{\pm\delta}$ the corresponding summed line averages measurements on the two image A and B (similar to $S_A$ and $S_B$ defined in Section 5 above as measured in domain 0). The line averages involved in both $S_A^{\pm\delta}$ and $S_B^{\pm\delta}$ are defined by introducing a $\delta$ shift to the BD line averages computed for domain 0. Often $\delta$ may not be an integer, in which case we mean that the locations of the line averages homogenously spanning both $S_A^{\pm\delta}$ and $S_B^{\pm\delta}$ are staggered in between the actual computed BD line averages, and are therefore obtained from the BD line averages by applying the appropriate linear interpolations.

As a measure for the stability of any $\delta$ approximation we may have we compute the $2^{nd}$ derivative of the error function (sum of square differences) in fitting the line averages $\{a_i\}$ measured in frame A on top of the line averages $\{b_i\}$ measured in frame B, using the suggested $\delta$ shift.

The equations for this go as follows,
for $$\varphi(\delta) := \sum_{i=1}^{n} (a_i - b_{i+\delta})^2,$$

where the locations of $\{b_{i+\delta}\}$ are shifted from $\{a_i\}$ by $\delta$, correspondingly (similar to the definitions of $S_A^\delta$ and $S_B^\delta$ in FIG. 7).

We want to stabilize $\delta$ further, starting from the $\hat{\delta}$ approximation obtained by Eq. (2) and Eq. (3), by adjusting its definition to be directly supported by the image info to be $\delta$=arg min ($\phi(\delta)$),
and we will hence consider $\phi''(\hat{\delta})$ as a measure for the stability of.

We start with $\hat{\delta}$ the $\delta$ approximation we may have and generate a better $\hat{\delta}_{new}$ as follows (can iterate a few times until convergence):

$$\varphi(\delta) \approx \varphi + (\delta - \delta_k)\varphi' + \frac{(\delta - \delta_k)^2}{2}\varphi''$$

Hence we can iterate a few times with $$\hat{\delta}_{new} := \hat{\delta} - \frac{\varphi'(\hat{\delta})}{\varphi''(\hat{\delta})}$$

and then consider $\phi''(\hat{\delta})$ as a measure of our stability (the minimum of $\phi$ at $\hat{\delta}$ is more stable the larger $\phi''(\hat{\delta})$ is).

Figure 8:
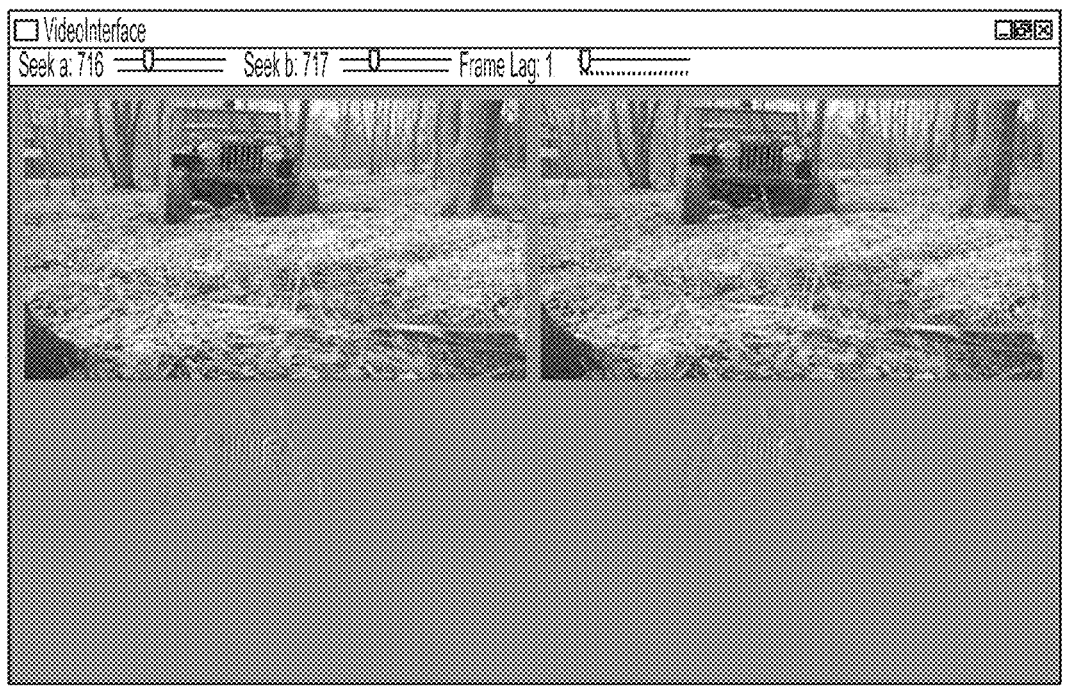
FIGS. 8-10 are computer screen shots depicting line averages delta computation for an object moving to the right within a frame.
Figure 9:
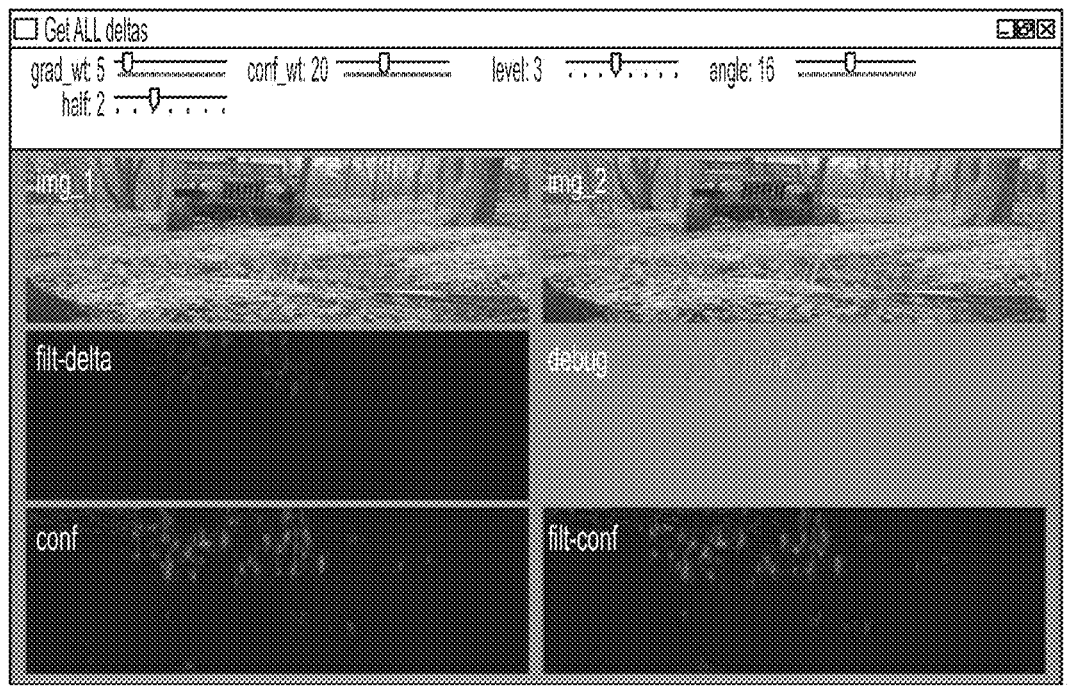
Figure 10:
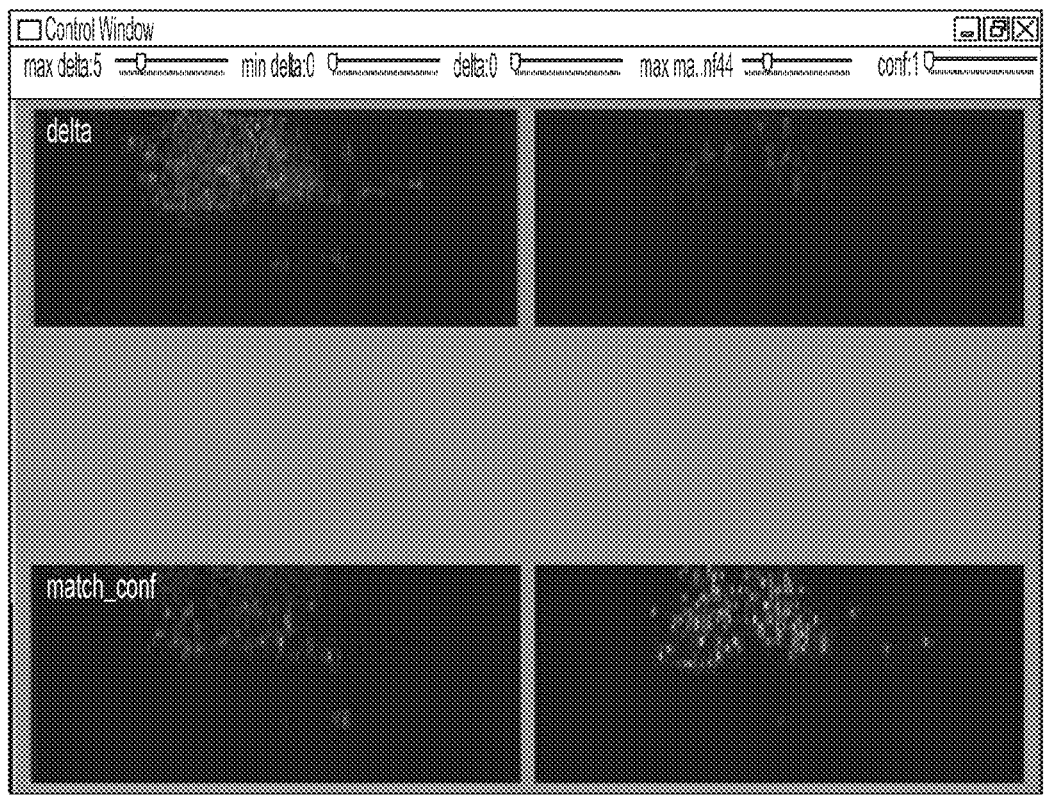

Section 7. Experimental Results: Testing the $\delta$-Motion Extraction, and Confidence In the example of FIGS. 8-10, the input frames depict a vehicle that is predominantly moving to the right wherein the delta computation is shown to be performing properly. In these figures, blue denotes detected local delta-motion to the right, or upwards, depending on and orthogonal to the measured line-average orientation in the depicted case, whereas red denotes left, or down, similarly depending on the line orientation. For relatively vertical orientations we compute right or left delta motion, whereas for the horizontal orientations we compute up or down delta motion. Green denotes the places in which we are more confident about the motion (see 'confidence'). Green colored on image edges means that the edges were confident places to determine the direction and magnitude of the motion.

Figure 11:
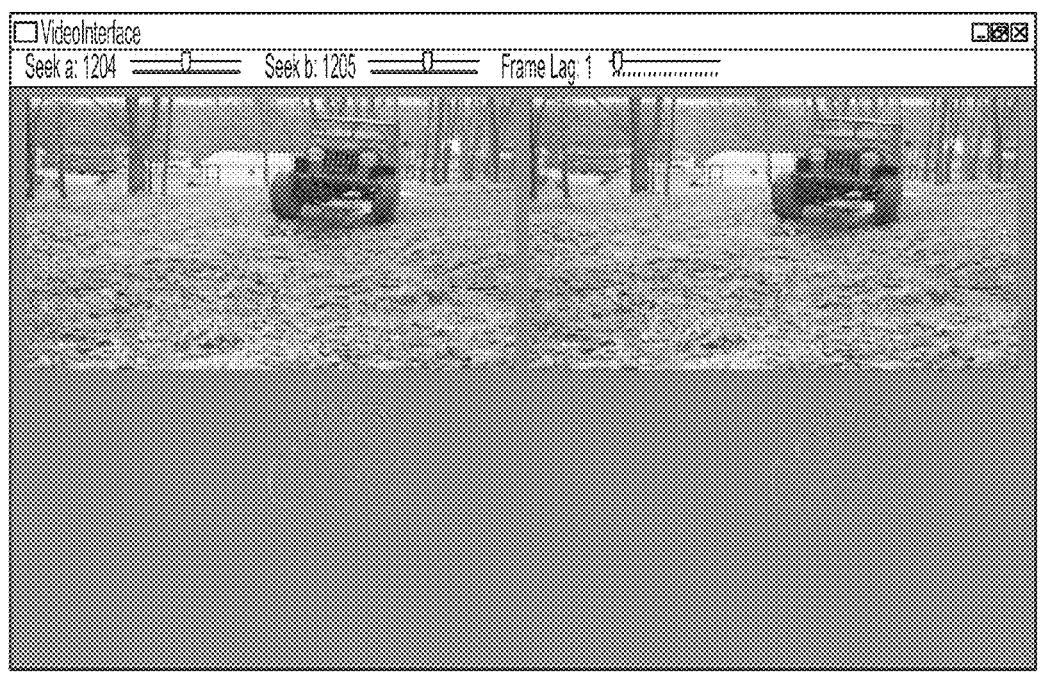
FIGS. 11-13 are computer screen shots depicting line averages delta computation for an object moving to the right within a frame with a portion of the image apparently moving in an opposite direction due to reflection.
Figure 12:
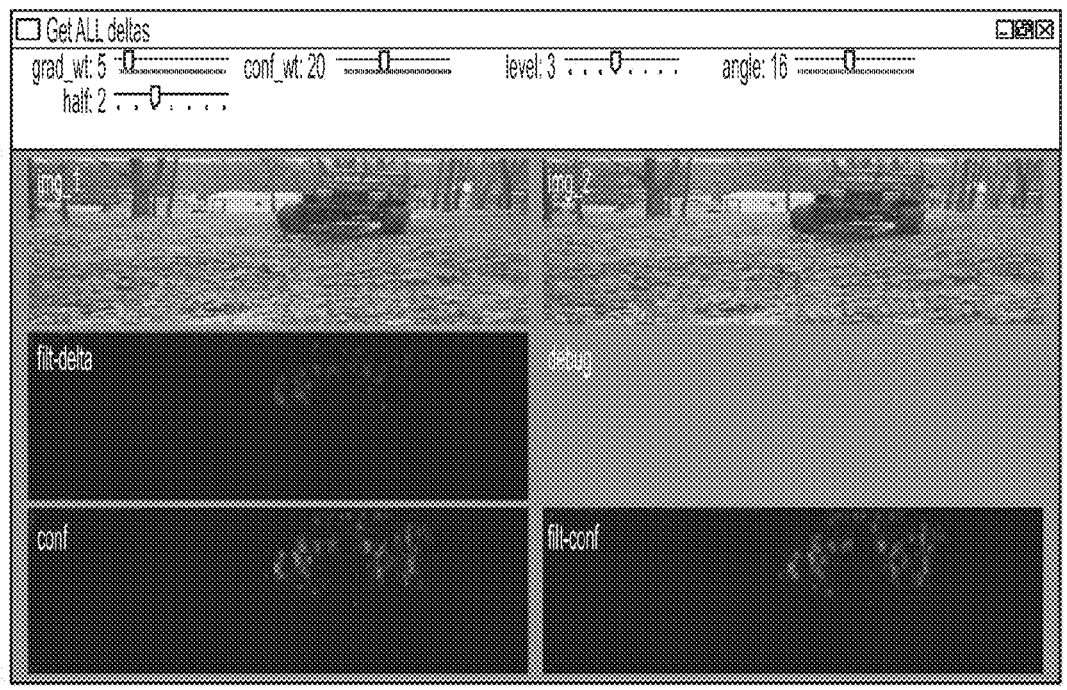
Figure 13:
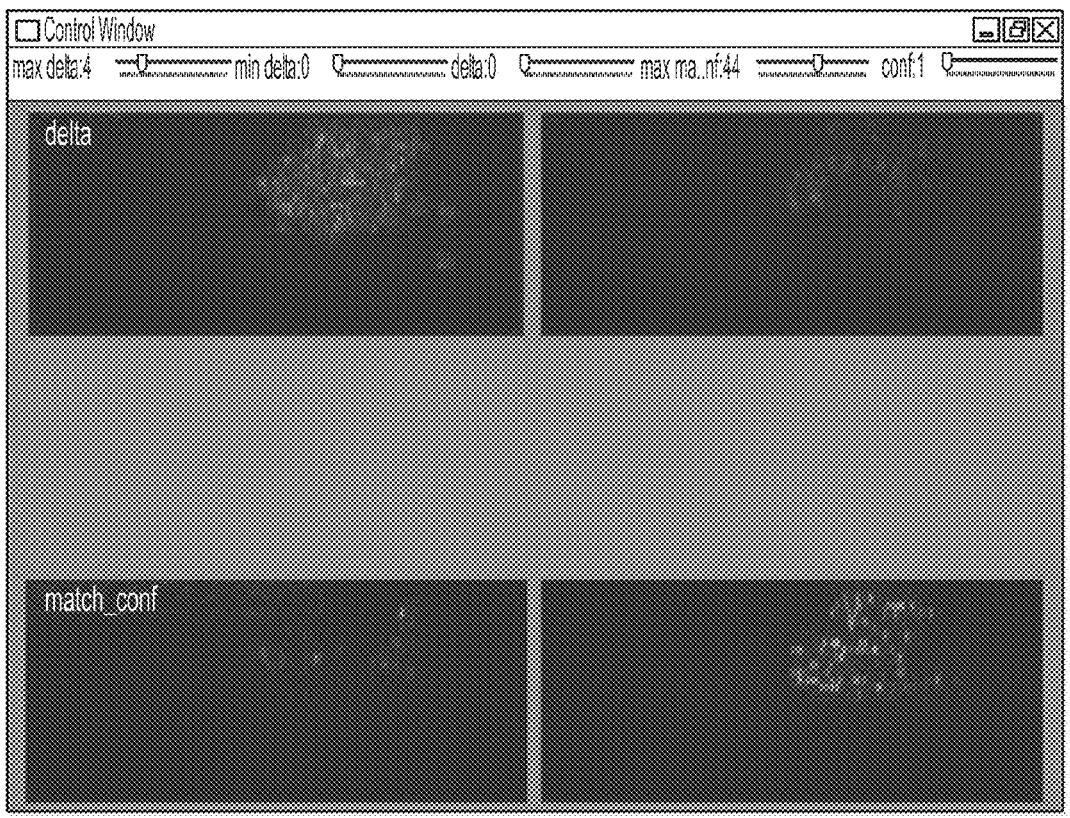

Another example is depicted in FIGS. 11-13 wherein a vehicle is moving to the left, and the delta computation is right in this case also. The only blue spot (delta in opposite direction) is from the images reflected by the windshield glass (i.e., the "wind shield mirror" which is a reflection of objects which go in the opposite direction.

Figure 14:
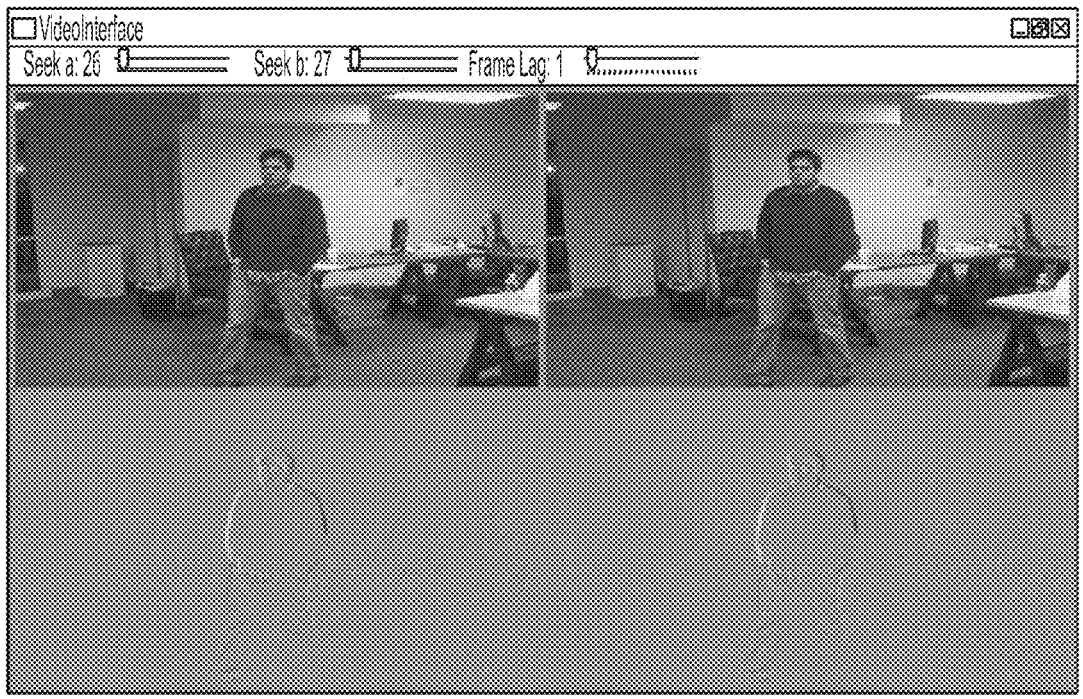
FIGS. 14-16 are computer screen shots depicting line averages delta computation for a substantially stationary main object with apparent motion caused by camera movement.
Figure 15:
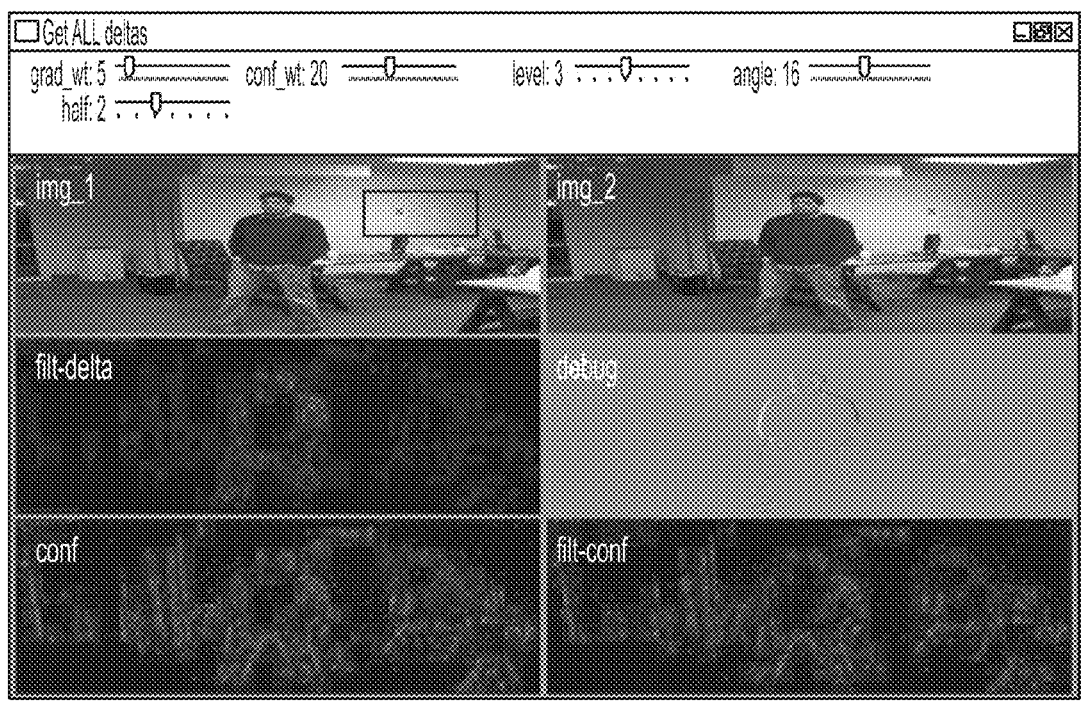
Figure 16:
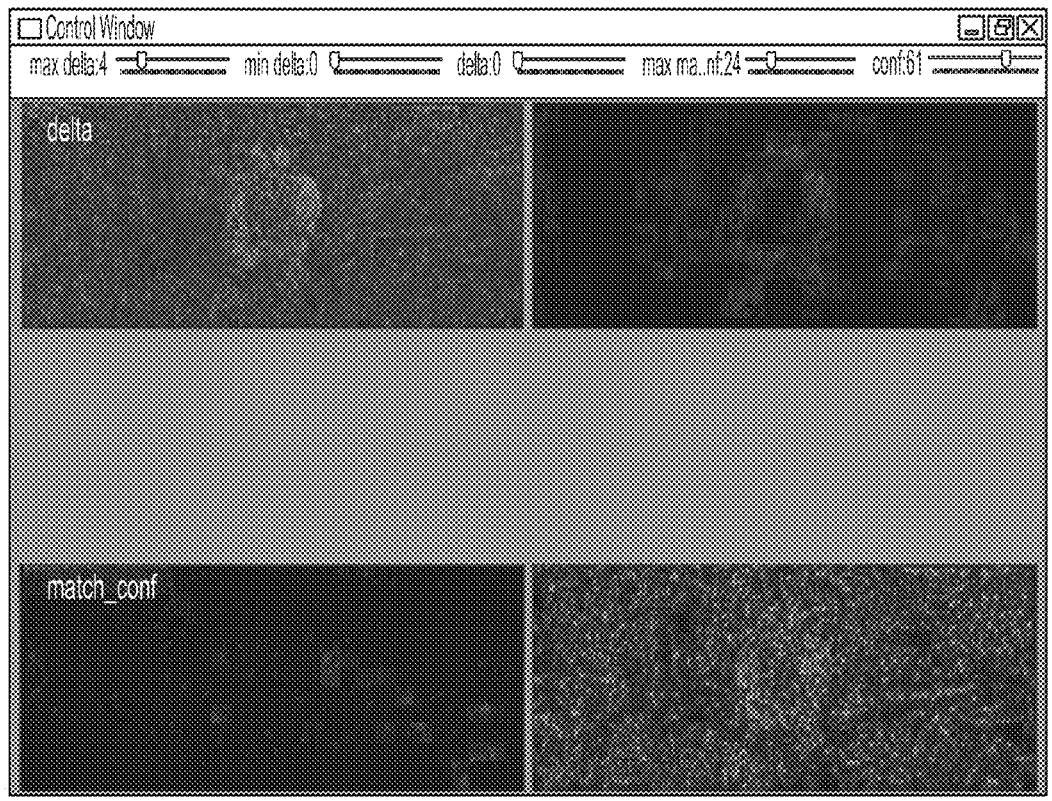

A third example is presented in FIGS. 14-16 wherein there is both camera motion and a central person moving to the left, and his left jeans moving to the right. This case is interesting with deltas being correctly computed. And all other object "edges" in the frame being correctly determined.

Figure 17:
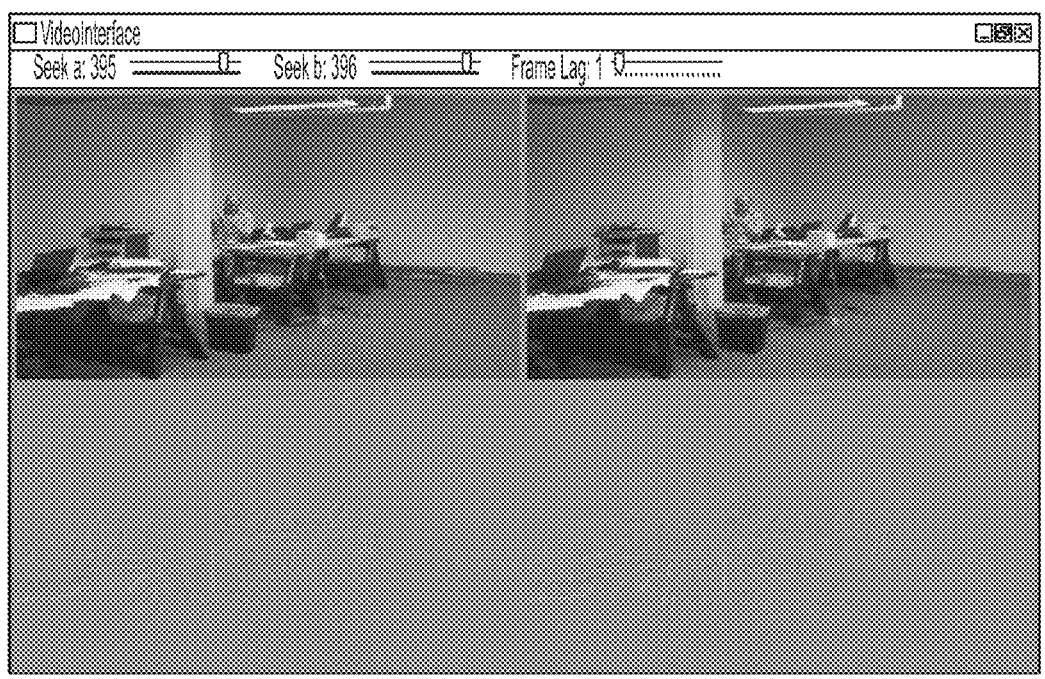
FIGS. 17-19 are computer screen shots depicting line averages delta computation for a moving main central object with simultaneous camera movement.
Figure 18:
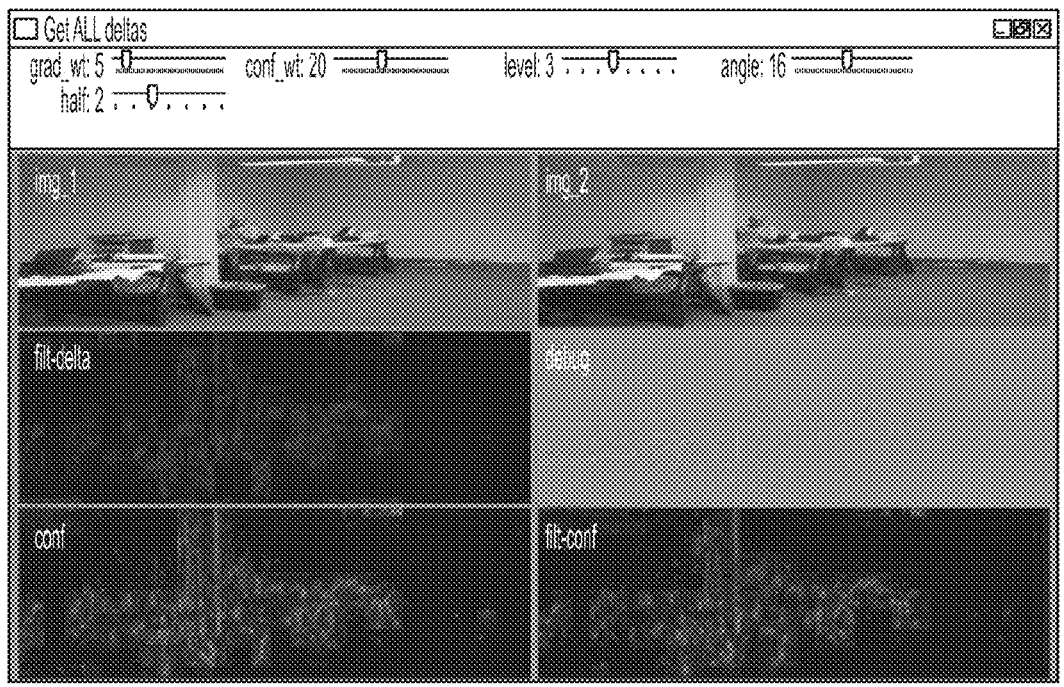
Figure 19:
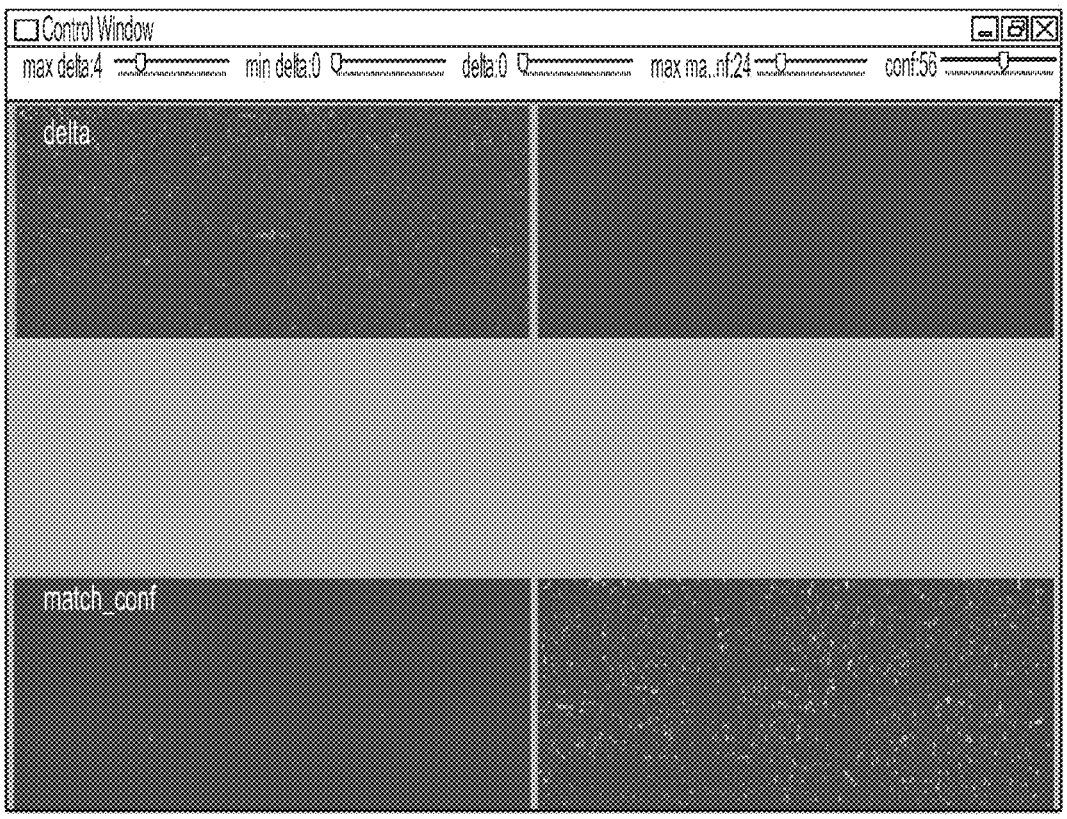
Figure 20:
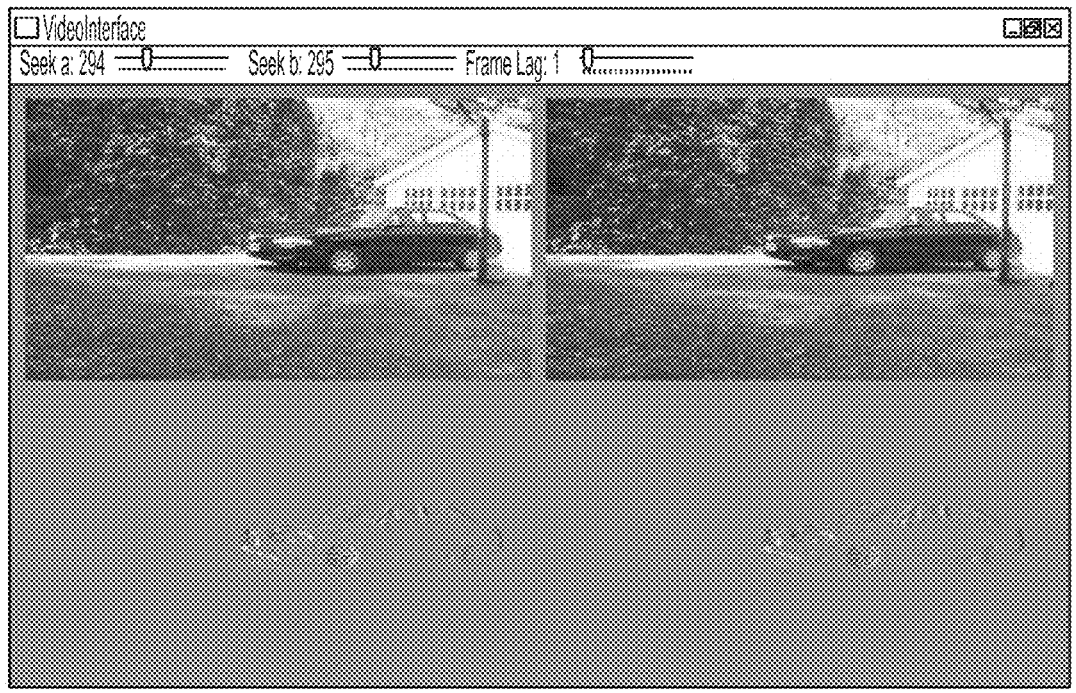
FIGS. 20-23 are computer screen shots depicting line averages delta computation for an outdoor scene including slow motion of an automobile within the frame.
Figure 21:
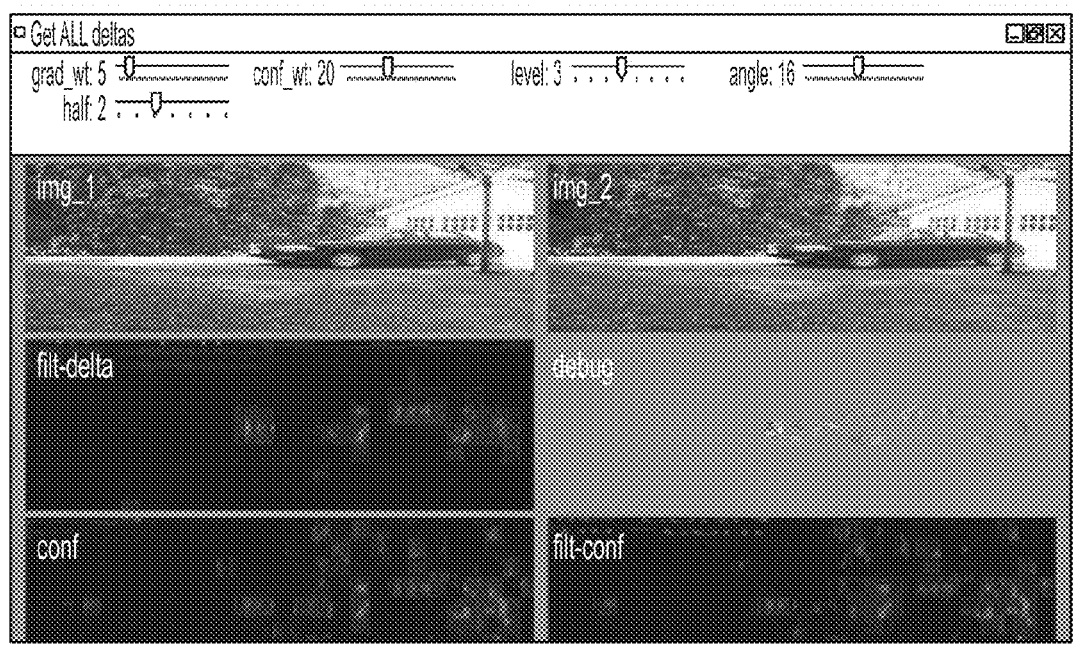
Figure 22:
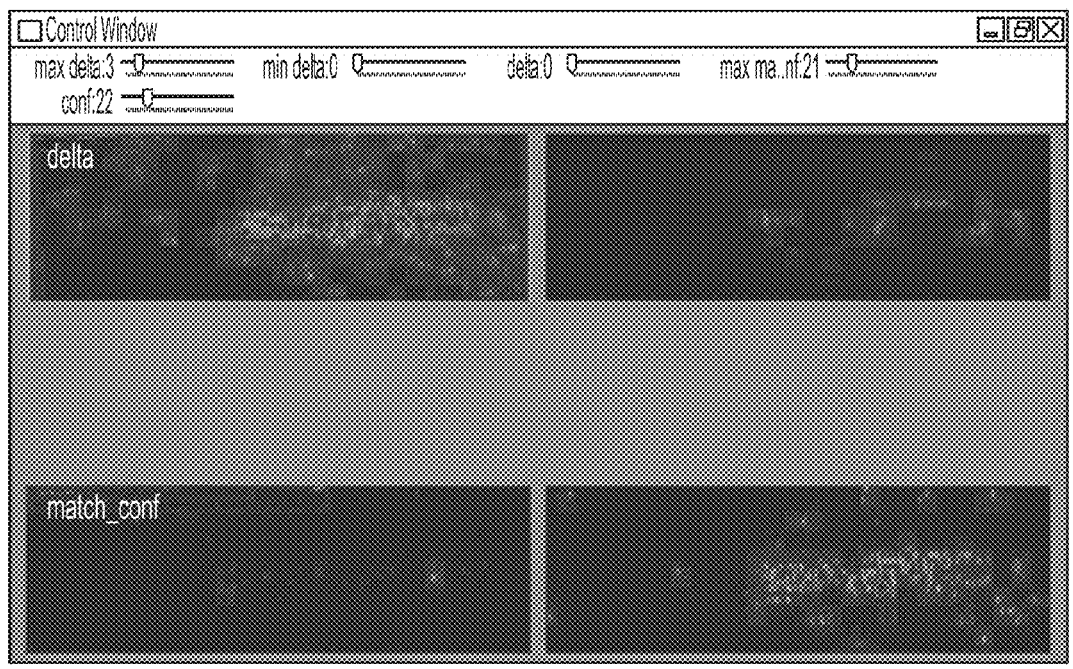
Figure 23:
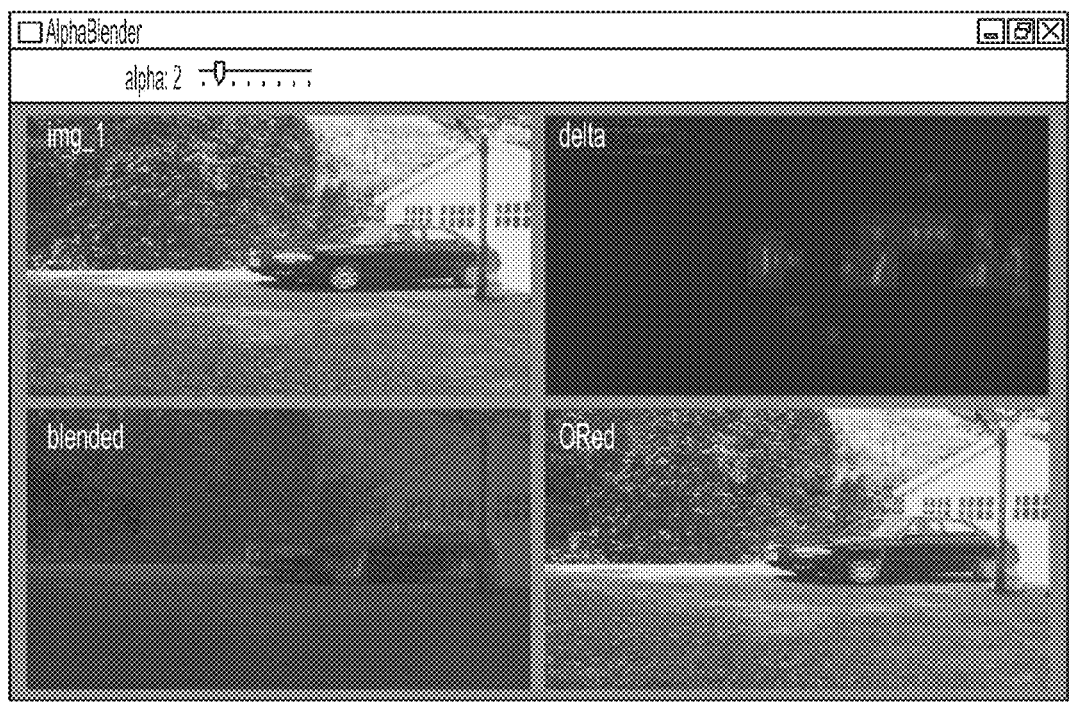

Example 4 as depicted in FIGS. 17-19 includes two frames in which there is just camera motion and edges of all objects are detected clearly as manifested by green coloring of the confidence level.

Example 5 shown in FIGS. 20-23 includes a car slowly moving toward the left of the frame.

Figure 24:
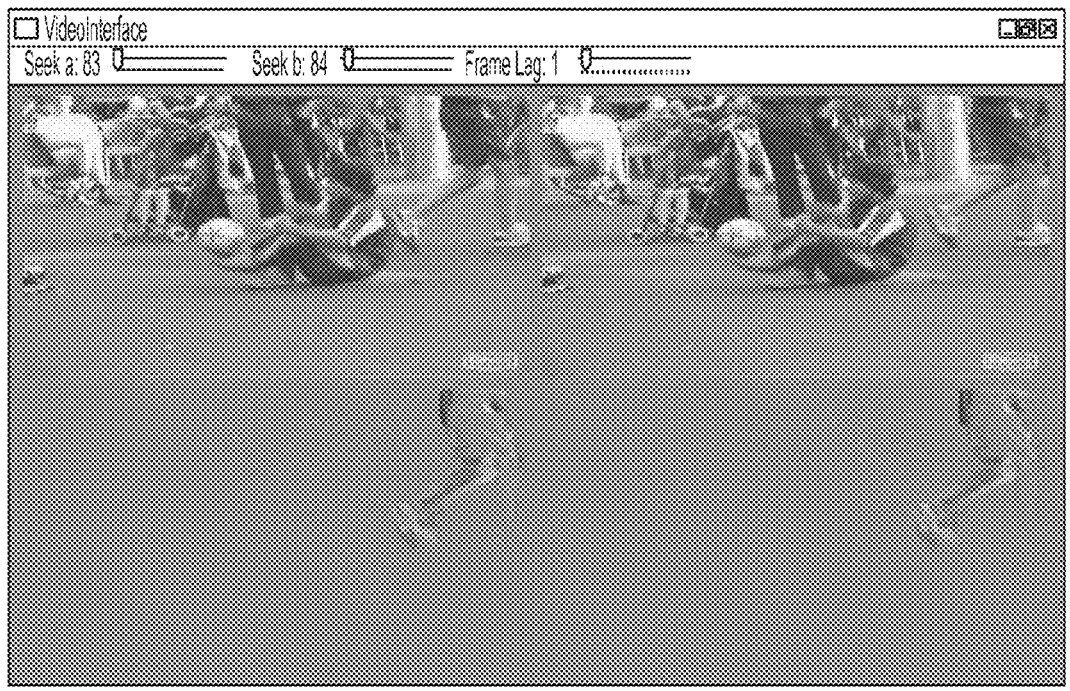
FIGS. 24-27 are computer screen shots depicting line averages delta computation for a complex outdoor scene requiring tracking of large movements of small objects suggesting use of a hierarchical method of motion computation progressing tom coarse to fine.
Figure 25:
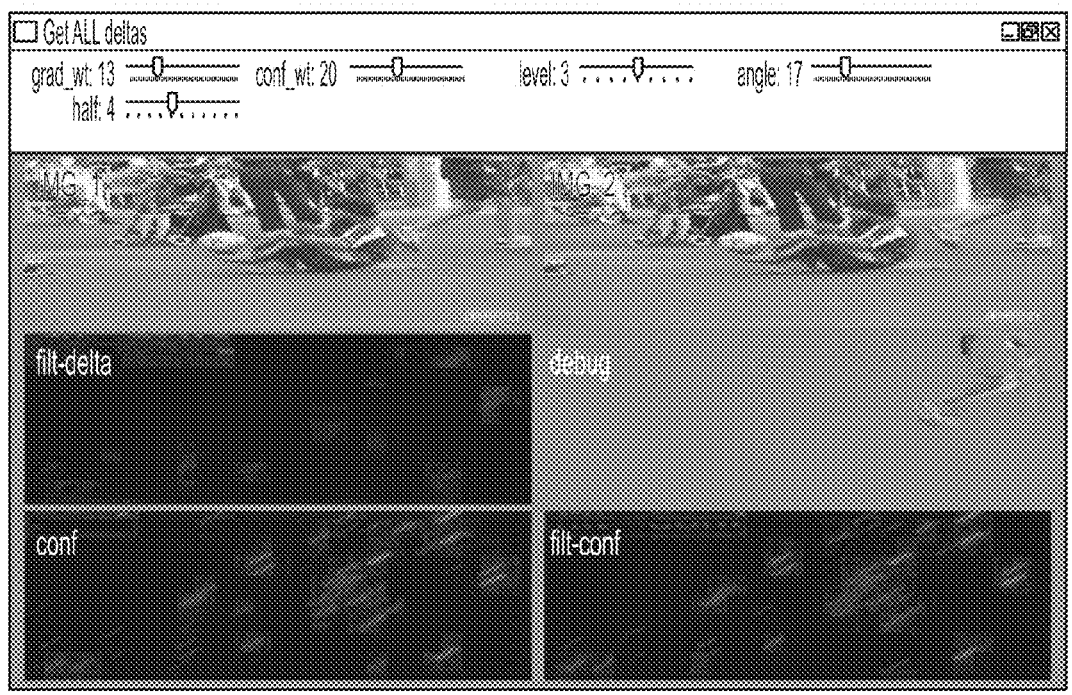
Figure 26:
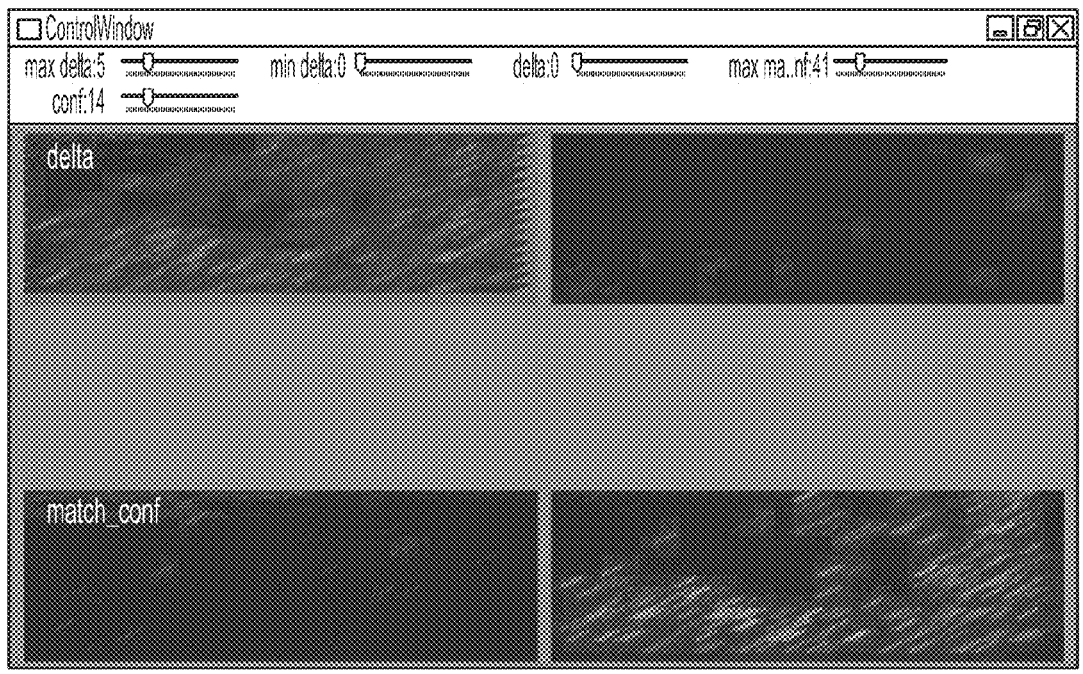
Figure 27:

Example 6 as depicted in FIGS. 24-26 shows a large motion of foot that is not being caught. When the motion of the object between the two frames is too large—the formula then being used cannot measure well without some tuning. A solution is to measure on a coarser version of the movie first where the motion is still rather small, i.e. thus introducing a hierarchy into the process of motion computation: from coarse to fine.

Figure 28:
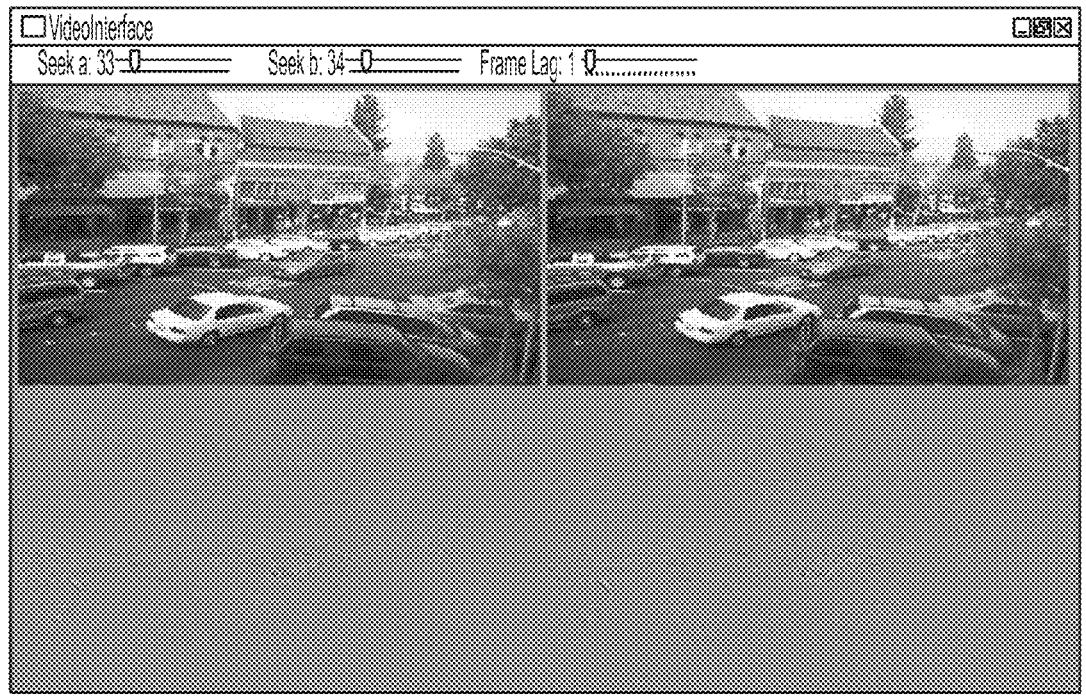
FIGS. 28-30 are computer screen shots depicting line averages delta computation for a street scene including typical parked and moving automobile traffic.
Figure 29:
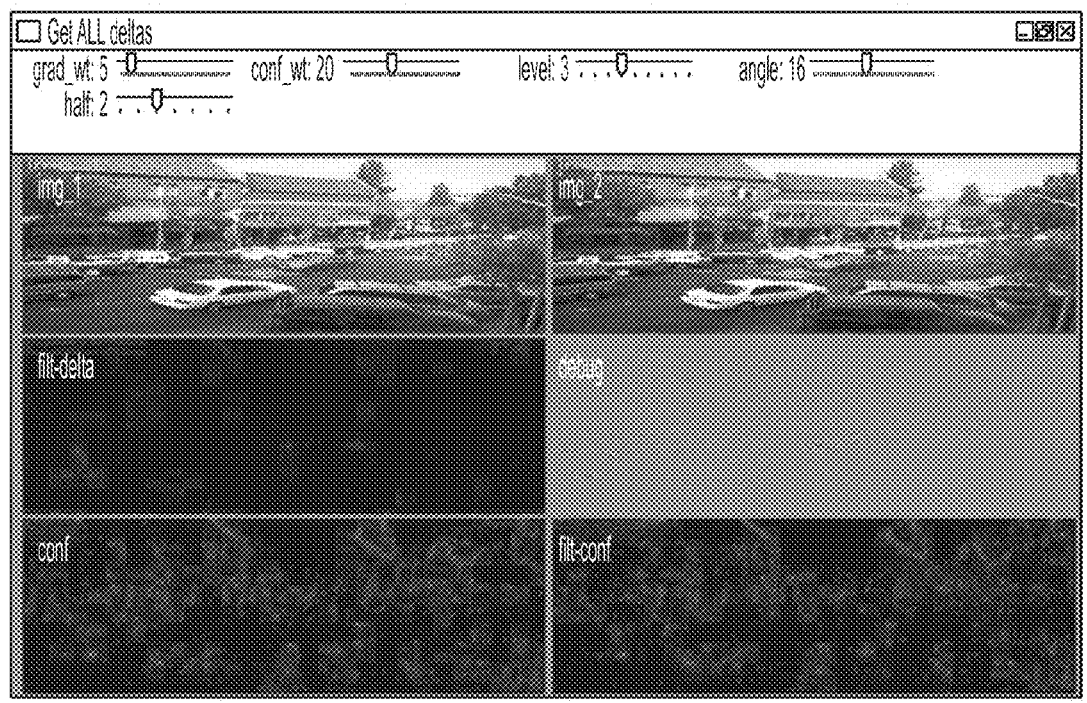
Figure 30:
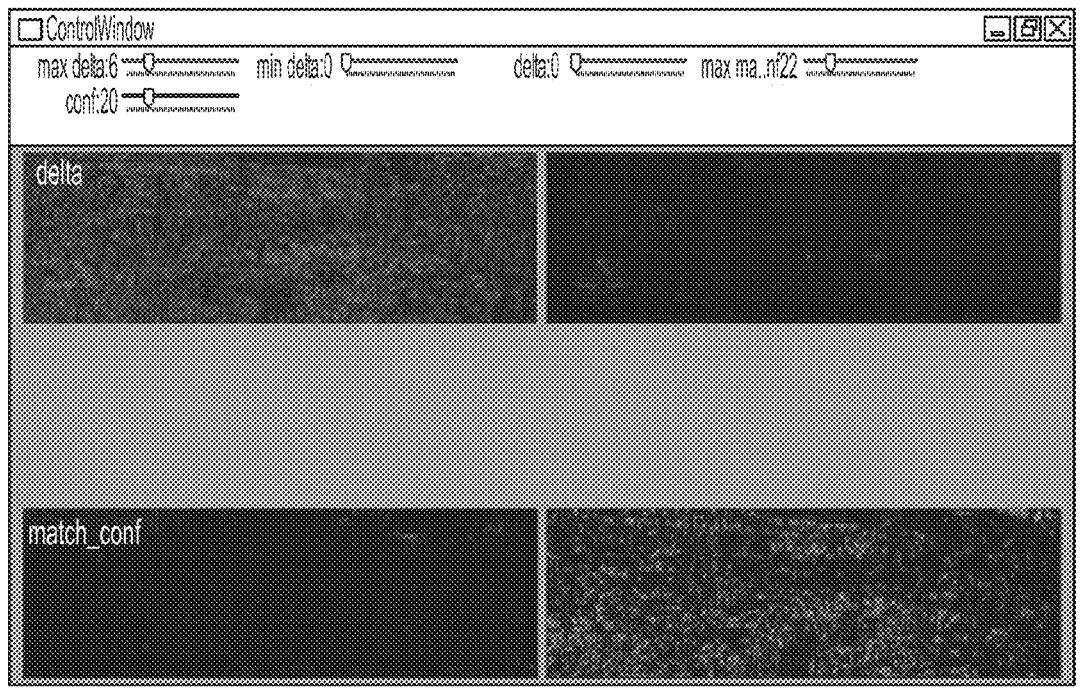

Example 7 as depicted in FIGS. 28-30 is based on a typical street scene wherein the resultant Deltas are appropriate and indicate proper functioning of the system.

Section 8 Hardware

Figure 31:
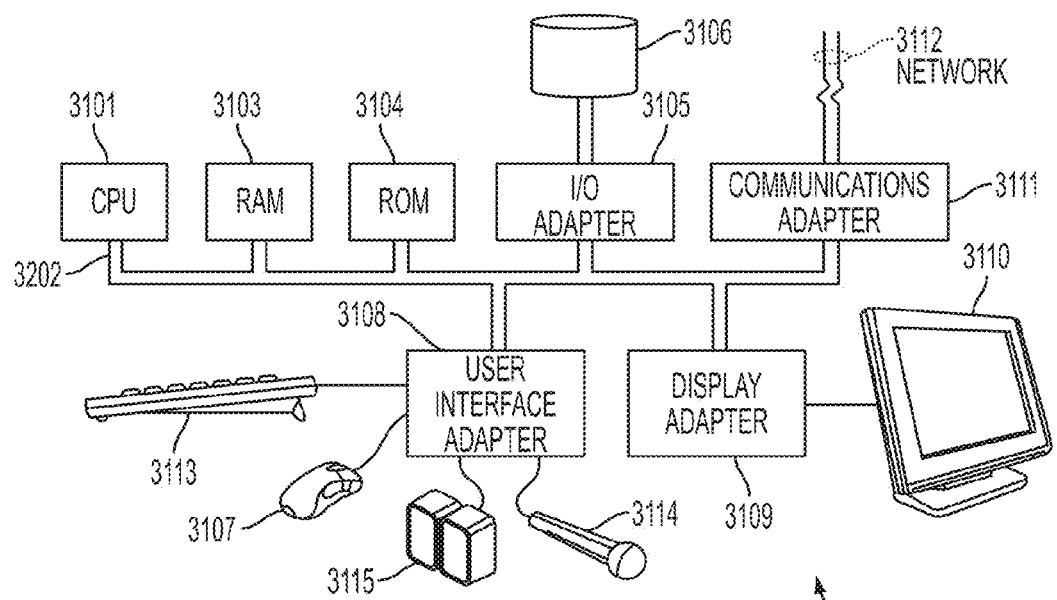
FIG. 31 is a block diagram of a computer platform for executing a computer program implementing embodiments of the invention.

FIG. 31 illustrates an exemplary computer system 3100 on which image processing including the calculation of line averages and/or integrals and identification of motion vectors may be implemented according to embodiments of the present invention. Central processing unit (CPU) 3101 is coupled to system bus 3102. CPU 3101 may be any general purpose CPU. The present invention is not restricted by the architecture of CPU 3101 (or other components of exemplary system 3100) as long as CPU 3101 (and other components of system 3100) supports the inventive operations as described herein. CPU 3101 may execute the various logical instructions according to embodiments of the present invention. For example, CPU 3101 may execute machine-level instructions according to the methods and steps described above in conjunction with FIGS. 1-3.

Computer system 3100 also preferably includes random access memory (RAM) 3103, which may be SRAM, DRAM, SDRAM, or the like. Computer system 3100 preferably includes read-only memory (ROM) 3104 which may be PROM, EPROM, EEPROM, or the like. RAM 3103 and ROM 3104 hold/store user and system data and programs, such as a machine-readable and/or executable program of instructions for video and image processing according to embodiments of the present invention.

Computer system 3100 also preferably includes input/output (I/O) adapter 3105, communications adapter 3111, user interface adapter 3108, and display adapter 3109. I/O adapter 3105, user interface adapter 3108, and/or communications adapter 3111 may, in certain embodiments, enable a user to interact with computer system 3100 in order to input information.

I/O adapter 3105 preferably connects to storage device(s) 3106, such as one or more of hard drive, compact disc (CD) drive, floppy disk drive, tape drive, etc. to computer system 3100. The storage devices may be utilized when RAM 3103 is insufficient for the memory requirements associated with storing data for operations of the system (e.g., storage of videos and related information). Although RAM 3103, ROM 3104 and/or storage device(s) 3106 may include media suitable for storing a program of instructions for object identification and motion calculation according to embodiments of the present invention, those having removable media may also be used to load the program and/or bulk data such as large video files.

Communications adapter 3111 is preferably adapted to couple computer system 3100 to network 3112, which may enable information to be input to and/or output from system 3100 via such network 3112 (e.g., the Internet or other wide-area network, a local-area network, a public or private switched telephony network, a wireless network, any combination of the foregoing). For instance, users identifying or otherwise supplying a video for processing may remotely input access information or video files to system 3100 via network 3112 from a remote computer. User interface adapter 3108 couples user input devices, such as keyboard 3113, pointing device 3107, and microphone 3114 and/or output devices, such as speaker(s) 3115 to computer system 3100. Display adapter 3109 is driven by CPU 3101 to control the display on display device 3110 to, for example, display information regarding a video being processed and providing for interaction of a local user or system operator during video and image processing operations.

It shall be appreciated that the present invention is not limited to the architecture of system 3100. For example, any suitable processor-based device may be utilized for implementing object extraction and video indexing, including without limitation personal computers, laptop computers, computer workstations, and multi-processor servers. Moreover, embodiments of the present invention may be implemented on application specific integrated circuits (ASICs) or very large scale integrated (VLSI) circuits. In fact, persons of ordinary skill in the art may utilize any number of suitable structures capable of executing logical operations according to the embodiments of the present invention.

It should be noted and understood that all publications, patents and patent applications mentioned in this specification (including publications contained in the list of references that follow) are indicative of the level of skill in the art to which the invention pertains. All publications, patents and patent applications are herein incorporated by reference to the same extent as if each individual publication, patent or patent application was specifically and individually indicated to be incorporated by reference in its entirety.

REFERENCES

1. A. Brandt and J. Dym. "Fast calculation of multiple line averages". *SIAM J. Sci. Comp.* Vol. 20, No. 4, pp 1417-1429. 1999.
2. B. Lucas and T. Kanade, "An iterative image registration technique with an application to stereo vision". *Proceedings of the International Joint Conference on Artificial Intelligence,* 1981.
3. Paul Bourke "Intersection point of two lines (2 dimensions)" http://local.wasp.uwa.edu.au/~pbourke/geometry/lineline2d/
4. Lucas B D and Kanade T 1981, An iterative image registration technique with an application to stereo vision. *Proceedings of Imaging understanding workshop*, pp 121-130.
5. Jianbo Shi and Carlo Tomasi. *Good Features to Track. IEEE Conference on Computer Vision and Pattern Recognition*, pages 593-600, 1994.

The invention claimed is:

1. A method of processing an image comprising the steps of:
    computing a plurality of line averages for a first image;
    identifying a set of pairs of line averages having high edge strengths;
    identifying a set of maximal pairs of line averages from among said set of line averages having high edge strength;
    expanding each of said maximal pairs of line averages into line stacks to form a set of line stacks;
    applying said set of line stacks to a second image so as to compute lines averages for said second image; and
    computing a distance between line stacks of said first and second images.

2. The method according to claim 1 wherein:
    said step of identifying said set of pairs of line averages having high edge strength forms clusters of said pairs of line averages having high edge strength; and
    said step of identifying a set of maximal pairs of line averages includes eliminating from each of said clusters line averages having adjacent pairs with a higher edge strength.

3. The method according to claim 1 wherein said step of identifying said set maximal pairs of line averages includes suppressing non-maximal pairs of said set of pairs of line averages having high edge strengths by eliminating pairs having any adjacent pairs with higher edge strength.

4. The method according to claim 1 wherein said first and second images are part of a sequence of video images.

5. The method according to claim 1 further comprising a step of translating each of said line stacks of said second image in a direction corresponding to said computed distances.

6. The method according to claim 5 wherein said step of translating includes shifting each of said line stacks in a direction orthogonal to lines of said line stack by a distance equal to respective computed distances to center each of said line stacks on respective areas of highest edge strength 7. The method according to claim 5 wherein said step of translating includes centering said line stacks of said second image on respective areas of highest edge strength.

8. The method according to claim 5 further comprising a step of verifying that all line averages fit to true object motion by compensating for edge movement internal to an object.

9. The method according to claim 1 wherein said step of computing said plurality of line averages includes implementing a Brandt-Dym method to compute said line averages.

10. The method according to claim 1 wherein said step of computing a plurality of line averages for said first image includes computing line averages for sets of line averages, each set having line averages of different geometries.

11. The method according to claim 10 wherein said different geometries include differences based on line length, width, angular orientation or relative position of lines of said pairs of line averages of said first image.

12. The method according to claim 1 wherein said step of computing a plurality of line averages for said first image includes computing line averages across different geometries of lines selected from the group consisting of different line (i) lengths, (ii) widths, (iii) angular orientations, and (iv) positions.

13. The method according to claim 1 wherein said step of computing a plurality of line averages for said first image includes computing an average color intensity value for a plurality of pixels defined by each of said line averages.

14. The method according to claim 1 wherein said step of computing a plurality of line averages for said first image includes computing line averages each spanning a plurality of pixel elements arranged in a rectangular array.

15. The method according to claim 1 wherein said step of identifying said set of pairs of line averages having high edge strengths includes a step of determining an intensity difference between line averages of each of said pairs of line averages.

16. The method according to claim 15 wherein said step of determining an intensity difference includes steps of determining an average pixel intensity of each line average of a pair of said line averages and subtracting said average pixel intensities to produce an edge intensity corresponding to each of said pairs of said line averages.

17. The method according to claim 1 wherein said step of identifying said set of pairs of line averages having high edge strengths includes a step of determining whether a difference in average pixel intensity of neighboring lines satisfies a threshold condition.

18. The method according to claim 1 wherein said step of computing distance between line stacks of said first and second images includes generating a set of motion vectors describing a movement of edges between said first and second images.

19. The method according to claim 1 wherein said step of expanding each of said maximal pairs of line averages into said line stacks to form said set of line stacks includes:
identifying, for each of said maximal pairs, a set of $2^n$ adjacent line averages wherein n is an integer value great than 1.

20. The method according to claim 19 wherein each of said sets of $2^n$ adjacent line averages include line averages taken over regions each having a major axis that is substantially parallel to that of the other regions of a set.

21. The method according to claim 1 wherein said step of expanding each of said maximal pairs of line averages into said line stacks to form said set of line stacks includes:
outwardly expanding from a centralized one of said maximal pairs to include, within each of said line stacks, line averages of immediately adjacent lines.

22. A method of calculating motion vectors of an object included in a video comprising the steps of:
identifying, within a first image of said video, pairs of line averages having strong differences indicating high edge strengths;
suppressing non-maximal pairs of said pairs of line averages by eliminating ones of said pairs having adjacent pairs with higher edge strength leaving a plurality of remaining pairs of line averages;
maximizing differences of said remaining pairs of said line averages to obtain local maximum edginess by adjusting line parameters length, width, angular orientation and location of pairs;
expanding said remaining pairs of said line averages into line stacks of lines;
applying said line stacks to a another image of said video;
identifying, for each line stack within said other image, a line pair having maximum differences indicating highest edge strength within line stack;
translating said line stacks within said other image in direction orthogonal to said line stack lines to center line stacks on respective areas of highest edge strength; and
calculating motion vectors between original and translated line stack positions.

23. An apparatus for processing an image, the apparatus comprising:
a line averaging engine configured to compute a plurality of line averages for a first image;
an edge detection engine configured to identify a set of pairs of line averages having high edge strengths;
an edge extraction engine configured to identify a set of maximal pairs of line averages from among said set of line averages having high edge strength;
a stack creation engine configured to expand each of said maximal pairs of line averages into line stacks to form a set of line stacks;
a stack overlay engine configured to apply said set of line stacks to a second image so as to compute lines averages for said second image; and
a motion detection engine configured to compute a distance between line stacks of said first and second images.

24. An apparatus for calculating motion vectors of an object included in a video, the apparatus comprising:
a line averaging engine configured to identify, within a first image of said video, pairs of line averages having strong differences indicating high edge strengths;
an edge extraction engine configured to suppressing non-maximal pairs of said pairs of line averages by eliminating ones of said pairs having adjacent pairs with higher edge strength leaving a plurality of remaining pairs of line averages;
a stack creation engine configured to expand said remaining pairs of said line averages into line stacks of lines;
a stack overlay engine configured to apply said line stacks to a another image of said video; and
a motion detection engine configured to:
identify, for each line stack within said other image, a line pair having maximum differences indicating highest edge strength within line stack,
translate said line stacks within said other image in direction orthogonal to said line stack lines to center line stacks on respective areas of highest edge strength, and
calculate motion vectors between original and translated line stack positions.

25. A non-transitory computer usable medium having computer readable program code embodied therein for processing images, the computer readable program code including:
computer readable program code for causing the computer to compute a plurality of line averages for a first image;
computer readable program code for causing the computer to identify a set of pairs of line averages having high edge strengths;
computer readable program code for causing the computer to identify a set of maximal pairs of line averages from among said set of line averages having high edge strength;
computer readable program code for causing the computer to expand each of said maximal pairs of line averages into line stacks to form a set of line stacks;
computer readable program code for causing the computer to apply said set of line stacks to a second image so as to compute lines averages for said second image; and
computer readable program code for causing the computer to compute a distance between line stacks of said first and second images.

26. The apparatus according to claim 23 wherein:
said edge detection engine is further configured to form clusters of said pairs of line averages having high edge strength; and
said edge extraction engine is further configured to eliminate from each of said clusters line averages having adjacent pairs with a higher edge strength.

27. The apparatus according to claim 23 wherein said edge extraction engine is further configured to suppress non-maximal pairs of said set of pairs of line averages having high edge strengths by eliminating pairs having any adjacent pairs with higher edge strength.

28. The apparatus according to claim 23 wherein said first and second images are part of a sequence of video images.

29. The apparatus according to claim 23 further comprising a translating engine configured to translate each of said line stacks of said second image in a direction corresponding to said computed distances.

30. The apparatus according to claim 27 wherein said translating engine is further configured to shift each of said line stacks in a direction orthogonal to lines of said line stack by a distance equal to respective computed distances to center each of said line stacks on respective areas of highest edge strength 31. The apparatus according to claim 27 wherein said translating engine is further configured to center said line stacks of said second image on respective areas of highest edge strength.

32. The apparatus according to claim 27 wherein said translating engine is further configured to verify that all line averages fit to true object motion by compensating for edge movement internal to an object.

33. The apparatus according to claim 23 wherein said line averaging engine is further configured to implement a Brandt-Dym method to compute said line averages.

34. The apparatus according to claim 23 wherein said line averaging engine is further configured to compute line averages for sets of line averages, each set having line averages of different geometries.

35. The apparatus according to claim 32 wherein said different geometries include differences based on line length, width, angular orientation or relative position of lines of said pairs of line averages of said first image.

36. The apparatus according to claim 23 wherein said line averaging engine is further configured to compute line averages across different geometries of lines selected from the group consisting of different line (i) lengths, (ii) widths, (iii) angular orientations, and (iv) positions.

37. The apparatus according to claim 23 wherein said line averaging engine is further configured to average color intensity values for a plurality of pixels defined by each of said line averages.

38. The apparatus according to claim 23 wherein said line averaging engine is further configured to compute line averages each spanning a plurality of pixel elements arranged in a rectangular array.

39. The apparatus according to claim 23 wherein said edge detection engine is further configured to calculate an intensity difference between line averages of each of said pairs of line averages.

40. The apparatus according to claim 37 wherein said edge detection engine is further configured to calculate an average pixel intensity of each line average of a pair of said line averages and subtract said average pixel intensities to produce an edge intensity corresponding to each of said pairs of said line averages.

41. The apparatus according to claim 23 wherein said edge detection engine is further configured to determine a difference in average pixel intensity of neighboring lines satisfies a threshold condition.

42. The apparatus according to claim 23 wherein said motion detection engine is further configured to generate a set of motion vectors describing a movement of edges between said first and second images.

43. The apparatus according to claim 23 wherein said stack creation engine is further configured to identify, for each of said maximal pairs, a set of $2^n$ adjacent line averages wherein n is an integer value great than 1.

44. The apparatus according to claim 41 wherein each of said sets of $2^n$ adjacent line averages include line averages taken over regions each having a major axis that is substantially parallel to that of the other regions of a set.

45. The apparatus according to claim 23 wherein said stack creation engine is further configured to outwardly expand from a centralized one of said maximal pairs to include, within each of said line stacks, line averages of immediately adjacent lines.

46. The computer usable medium according to claim 25 wherein:
said computer readable code for causing the computer to identify said set of pairs of line averages having high edge strength include computer readable code for causing said computer to form clusters of said pairs of line averages having high edge strength; and
said computer readable code for causing the computer to identify a set of maximal pairs of line averages includes computer readable code for causing said computer to eliminate, from each of said clusters, line averages having adjacent pairs with a higher edge strength.

47. The computer usable medium according to claim 25 wherein said computer readable code for causing the computer to identify said set maximal pairs of line averages includes computer readable code for causing the computer suppress non-maximal pairs of said set of pairs of line averages having high edge strengths by eliminating pairs having any adjacent pairs with higher edge strength.

48. The computer usable medium according to claim 25 wherein said first and second images are part of a sequence of video images.

49. The computer usable medium according to claim 25 further comprising computer readable code for causing the computer to translate each of said line stacks of said second image in a direction corresponding to said computed distances.

50. The computer usable medium according to claim 49 wherein said computer readable code for causing the computer to translate each of said line stacks includes computer readable code for causing said computer to shift each of said line stacks in a direction orthogonal to lines of said line stack by a distance equal to respective computed distances to center each of said line stacks on respective areas of highest edge strength.

51. The computer usable medium according to claim 49 wherein said computer readable code for causing the computer to translate each line of said line stacks in said second image includes computer readable code for causing the computer to center said line stacks of said second image on respective areas of highest edge strength.

52. The computer usable medium according to claim 49 further comprising computer readable code for causing the computer to verify that all line averages fit to true object motion by compensating for edge movement internal to an object.

53. The computer usable medium according to claim 25 wherein said computer readable code for causing the computer to compute said plurality of line averages includes computer readable code for causing the computer to implement a Brandt-Dym method to compute said line averages.

54. The computer usable medium according to claim 25 wherein said computer readable code for causing the computer to compute a plurality of line averages for said first image includes computer readable code for causing the computer to compute line averages for sets of line averages, each set having line averages of different geometries.

55. The computer usable medium according to claim 54 wherein said different geometries include differences based on line length, width, angular orientation or relative position of lines of said pairs of line averages of said first image.

56. The computer usable medium according to claim 25 wherein said computer readable code for causing the computer to compute a plurality of line averages for said first image includes computer readable code for causing the computer to compute line averages across different geometries of lines selected from the group consisting of different line (i) lengths, (ii) widths, (iii) angular orientations, and (iv) positions.

57. The computer usable medium according to claim 25 wherein said computer readable code for causing the computer to compute a plurality of line averages for said first image includes computer readable code for causing the computer to compute an average color intensity value for a plurality of pixels defined by each of said line averages.

58. The computer usable medium according to claim 25 wherein said computer readable code for causing the computer to compute a plurality of line averages for said first image includes computer readable code for causing the computer to compute line averages each spanning a plurality of pixel elements arranged in a rectangular array.

59. The computer usable medium according to claim 25 wherein said computer readable code for causing the computer to identify said set of pairs of line averages having high edge strengths includes computer readable code for causing the computer to determine an intensity difference between line averages of each of said pairs of line averages.

60. The computer usable medium according to claim 59 wherein said computer readable code for causing the computer to determine an intensity difference includes computer readable code for causing the computer to determine an average pixel intensity of each line average of a pair of said line averages and subtract said average pixel intensities to produce an edge intensity corresponding to each of said pairs of said line averages.

61. The computer usable medium according to claim 25 wherein said computer readable code for causing the computer to identify said set of pairs of line averages having high edge strengths includes computer readable code for causing the computer to determine whether a difference in average pixel intensity of neighboring lines satisfies a threshold condition.

62. The computer usable medium according to claim 25 wherein said computer readable code for causing the computer to compute said distance between line stacks of said first and second images includes computer readable code for causing the computer to generate a set of motion vectors describing a movement of edges between said first and second images.

63. The computer usable medium according to claim 25 wherein said computer readable code for causing the computer to expand each of said maximal pairs of line averages into said line stacks to form said set of line stacks includes computer readable code for causing the computer to:
identify, for each of said maximal pairs, a set of $2^n$ adjacent line averages wherein n is an integer value great than 1.

64. The computer usable medium according to claim 63 wherein each of said sets of $2^n$ adjacent line averages include line averages taken over regions each having a major axis that is substantially parallel to that of the other regions of a set.

65. The computer usable medium according to claim 25 wherein said computer readable code for causing the computer to expand each of said maximal pairs of line averages into said line stacks to form said set of line stacks includes computer readable code for causing the computer to outwardly expand from a centralized one of said maximal pairs to include, within each of said line stacks, line averages of immediately adjacent lines.

66. A non-transitory computer usable medium having computer readable program code embodied therein for calculating motion vectors of an object included in a video, the computer readable program code including:
computer readable program code for causing the computer to identify, within a first image of said video, pairs of line averages having strong differences indicating high edge strengths;
computer readable program code for causing the computer to suppress non-maximal pairs of said pairs of line averages by eliminating ones of said pairs having adjacent pairs with higher edge strength leaving a plurality of remaining pairs of line averages;
computer readable program code for causing the computer to maximize differences of said remaining pairs of said line averages to obtain local maximum edginess by adjusting line parameters length, width, angular orientation and location of pairs;
computer readable program code for causing the computer to expand said remaining pairs of said line averages into line stacks of lines;
computer readable program code for causing the computer to apply said line stacks to a another image of said video;
computer readable program code for causing the computer to identify, for each line stack within said other image, a line pair having maximum differences indicating highest edge strength within line stack;
computer readable program code for causing the computer to translate said line stacks within said other image in direction orthogonal to said line stack lines to center line stacks on respective areas of highest edge strength; and
computer readable program code for causing the computer to calculate motion vectors between original and translated line stack positions.

* * * * *